(12) United States Patent
Nelson et al.

(10) Patent No.: US 7,546,143 B2
(45) Date of Patent: *Jun. 9, 2009

(54) MULTI-CHANNEL QUIET CALLS

(75) Inventors: Lester D. Nelson, Santa Clara, CA (US); Laurent Denoue, Palo Alto, CA (US); William N. Schilit, Menlo Park, CA (US); Elizabeth F. Churchill, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/024,982

(22) Filed: Dec. 18, 2001

(65) Prior Publication Data

US 2003/0138080 A1    Jul. 24, 2003

(51) Int. Cl.
  *H04M 1/00* (2006.01)
  *H04M 3/00* (2006.01)
  *H04M 3/42* (2006.01)
  *H04M 1/64* (2006.01)
  *H04M 11/00* (2006.01)
  *H04M 1/56* (2006.01)
  *H04B 1/38* (2006.01)
  *G06F 15/16* (2006.01)

(52) U.S. Cl. ............ 455/556.2; 455/416; 455/419; 455/557; 455/566; 455/567; 379/68; 379/88.12; 379/88.14; 379/93.19; 379/142.14; 379/142.15; 379/215.01; 709/206

(58) Field of Classification Search .......... 379/71, 379/93.11, 88.13, 52, 202.01, 88.17, 93.01, 379/355, 93.19, 93.35, 215.01, 68, 142.14, 379/142.15, 88.12, 88.14; 370/261, 353; 455/575.2, 412, 556, 556.1, 416, 419, 567, 455/557, 556.2, 566; 704/260; 708/141; 709/206

See application file for complete search history.

(56) References Cited

U.S. PATENT DOCUMENTS

| 4,241,521 | A | 12/1980 | Dufresne ................ 434/112 |
| 4,515,995 | A | 5/1985 | Bolick, Jr. et al. ........ 179/6.13 |
| 4,517,410 | A | 5/1985 | Williams et al. ........ 179/6.04 |
| 4,591,664 | A | 5/1986 | Freeman ............... 179/6.06 |
| 4,661,916 | A | 4/1987 | Baker et al. ............ 364/513.5 |
| 4,663,777 | A | 5/1987 | Szeto ..................... 379/88 |
| 4,715,060 | A | 12/1987 | Lipscher et al. ............ 379/70 |
| 4,975,948 | A * | 12/1990 | Andresen et al. ........ 379/355.09 |
| 4,985,913 | A | 1/1991 | Shalom et al. ............ 379/76 |
| 5,029,214 | A | 7/1991 | Hollander ............... 381/51 |

(Continued)

OTHER PUBLICATIONS

U.S. Appl. No. 09/658,243 by Lester D. Nelson, filed Sep. 8, 2000.*

(Continued)

*Primary Examiner*—Fan Tsang
*Assistant Examiner*—Lisa Hashem
(74) *Attorney, Agent, or Firm*—Fliesler Meyer LLP

(57) ABSTRACT

A system and method for simultaneously conducting multiple telephone conversations is provided. In an embodiment, a user converses with one individual on a first channel while simultaneously transmitting audible utterances to a second individual or a second channel. The user can select the desired channel or channels and a desired phrase and an electronic representation of the selected phrase is transmitted over the selected channel(s).

11 Claims, 29 Drawing Sheets

U.S. PATENT DOCUMENTS

| | | | | |
|---|---|---|---|---|
| 5,210,689 | A | 5/1993 | Baker et al. | 364/419 |
| 5,259,024 | A | 11/1993 | Morley, Jr. et al. | 379/88 |
| 5,297,041 | A | 3/1994 | Kushler et al. | 364/419.15 |
| 5,668,868 | A | 9/1997 | Nordenstrom | 379/447 |
| 5,764,748 | A * | 6/1998 | Rosenthal et al. | 379/215.01 |
| 5,790,957 | A | 8/1998 | Heidari | 455/553 |
| 5,822,403 | A | 10/1998 | Rowan | 379/68 |
| 5,894,504 | A * | 4/1999 | Alfred et al. | 379/88.13 |
| 5,920,303 | A | 7/1999 | Baker et al. | 345/133 |
| 5,991,374 | A | 11/1999 | Hazenfield | 379/101.01 |
| 5,991,723 | A * | 11/1999 | Duffin | 704/260 |
| 6,026,156 | A * | 2/2000 | Epler et al. | 379/215.01 |
| 6,212,401 | B1 * | 4/2001 | Ackley | 455/556.1 |
| 6,266,685 | B1 * | 7/2001 | Danielson et al. | 708/141 |
| 6,330,244 | B1 * | 12/2001 | Swartz et al. | 370/401 |
| 6,366,578 | B1 * | 4/2002 | Johnson | 370/353 |
| 6,366,771 | B1 | 4/2002 | Angle et al. | 455/414 |
| 6,404,860 | B1 * | 6/2002 | Casellini | 379/88.17 |
| 6,490,343 | B2 * | 12/2002 | Smith et al. | 379/52 |
| 6,496,692 | B1 | 12/2002 | Shanahan | 455/418 |
| 6,510,325 | B1 * | 1/2003 | Mack et al. | 455/575.2 |
| 6,577,859 | B1 * | 6/2003 | Zahavi et al. | 455/412.1 |
| 6,594,503 | B1 * | 7/2003 | Herzig et al. | 455/550.1 |
| 6,628,767 | B1 * | 9/2003 | Wellner et al. | 379/202.01 |
| 6,633,635 | B2 * | 10/2003 | Kung et al. | 379/215.01 |
| 6,766,007 | B1 * | 7/2004 | Dermler et al. | 379/201.01 |
| 6,803,864 | B2 * | 10/2004 | Chan | 341/22 |
| 6,850,604 | B2 * | 2/2005 | Cannell et al. | 379/93.01 |
| 6,882,863 | B2 * | 4/2005 | Hansson | 455/556.1 |
| 6,901,270 | B1 * | 5/2005 | Beach | 455/563 |
| 6,941,342 | B1 * | 9/2005 | Nelson | 709/204 |
| 7,095,826 | B2 * | 8/2006 | Crockett et al. | 379/88.12 |
| 7,106,852 | B1 * | 9/2006 | Nelson et al. | 379/387.01 |
| 7,123,707 | B1 * | 10/2006 | Hiri et al. | 379/215.01 |
| 7,232,072 | B1 * | 6/2007 | Bunte et al. | 235/462.45 |
| 7,280,653 | B2 * | 10/2007 | Kobayashi et al. | 379/355.1 |
| 7,363,252 | B2 * | 4/2008 | Fujimoto | 705/26 |
| 2001/0047429 | A1 | 11/2001 | Seng et al. | |
| 2001/0055949 | A1 | 12/2001 | Law et al. | |
| 2002/0055844 | A1 * | 5/2002 | L'Esperance et al. | 704/260 |
| 2002/0098831 | A1 * | 7/2002 | Castell et al. | 455/413 |
| 2002/0181671 | A1 * | 12/2002 | Logan | 379/88.13 |
| 2003/0002448 | A1 * | 1/2003 | Laursen et al. | 370/261 |
| 2003/0028380 | A1 * | 2/2003 | Freeland et al. | 704/260 |
| 2005/0074107 | A1 * | 4/2005 | Renner et al. | 379/202.01 |
| 2005/0254635 | A1 * | 11/2005 | Koretsky et al. | 379/142.08 |
| 2006/0279796 | A1 * | 12/2006 | Wishneusky et al. | 358/402 |
| 2007/0138270 | A1 * | 6/2007 | Reblin | 235/383 |

OTHER PUBLICATIONS

U.S. Appl. No. 09/657,370, filed Sep. 8, 2000, Nelson.
U.S. Appl. No. 09/658,673, filed Sep. 8, 2000, Nelson.
U.S. Appl. No. 09/658,612, filed Sep. 8, 2000, Nelson.
U.S. Appl. No. 09/658,245, filed Sep. 8, 2000, Nelson.
U.S. Appl. No. 09/658,243, filed Sep. 8, 2000, Nelson.
"Automated Braille Display," *Appalachian State University*, http://www1.aapstate.edu/dept/physics/weather/braille_display.html and "JPEG Image," http://www1.appstate.edu/dept/physics/weather/proto5.jpg, (printed Oct. 4, 2000).
"ATI Announces New Software Solution for Professionals—EvaluWare™," *Assistive Technology, Inc.*, Jul. 30, 1999, http://www.assistivetech.com/p-multivoice.htm.
Brody, M., Cell Phones: Clever Communications But Etiquette Disconnect, http://www.microsoft.com/BIZ/features/advice/brody/archive/cellphones.asp, (printed Aug. 27, 2001).
Jacobson, D., "Release of TalkToMe! V1.0," *macinsearch.com*, Mar. 3, 1999, http://www.machinsearch.com/news/19990309/news_19990309.21650.5.shtml.
Marti, S. and Schmandt, C., "Active Messenger: filtering and delivery in a heterogeneous network," draft submited to *Ubicomp 2001*, http://www.media.mit.edu/~stefanm/thesis/Active Messenger_conf_2001_04_20_draft.pdf.
"Why Minspeak®," Prentke Romich Company, http://www.prentrom.com/speech/speech.html, (printed Oct. 4, 2000).
Nelson, D., "Time Marches on—just listen to it!," Apr. 2, 1999, http://www.modbee.com/metro/story/0%2C1113%2C73735%2C00.html.
"What is Portico?" http://www.conectus.com/portico/portico.asp, (printed Oct. 4, 2000).
"The Teleface Project," The Royal Institute of Technology, http://www.speech.kth.se/teleface/, (printed Oct. 4, 2000).
Phone-Fun Special Effects Machine, ShopVoyager.com, Catalog No. #TE2200, www.shopvoyager.com, (printed Oct. 4, 2000).
"TTS: Synthesis of audible speech from text," *AT &T Labs—Research*, 2000, http://www.research.att.com/projects.tts.
Babel Technologies, http://www.babeltech.com/, (printed Aug. 10, 2001).
"Welcome to Our Multilingual Text-to-Speech Systems," Lucent Technologies, Bell Labs Innovations, http://www.bell-labs.com/project/tts, (printed Oct. 4, 2000).
"TruVoice from Centigram," http://svr-www.eng.ca.ac.uk/comp.speech/Section5/Synth/truvoice.html, (printed Aug. 10, 2001).
"DIXI+ A Portuguese Text-to-Speech Synthesizer For Alternative and Augmentative Communication," *Instituto de Engenharia de Sistemas e Computadores and Centro de Linguistica da Universidade de Lisboa*, 1999-2001, http://www.speech.inesc.pt/~lco/dixiplus/abstract.html.
"Elan Text to Speech," *Elan Informatique*, http://www.elantts.com/speech/shared/ess2txt.htm, (printed Jul. 30, 2001).
"The Festival Speech Synthesis System," *The University of Edinburgh*, http://www.cstr.ed.ac.uk/projects/festival/, (printed Oct. 5, 2000).
"The Epos Speech Synthesis System," http://epos.ure.cas.cz, (printed Oct. 5, 2000).
"iSPEAK: Let your text be heard," Fonix Corporation, Sep. 2000, http://www.fonix.com/products/ispeak. html.
"Speech Technology Group: Text-to-Speech Demo for Spanish(concatenative)," *GTH*, http://www-gth.die.upm._es/research/synthesis/synth-form-concat.html, (printed Oct. 5, 2000).
"German Festival," *IMS Phonetik, Institute of Natural Language Processing*, University of Stuttgart, Germany, http://www.ims.uni-stuttgart.de/phonetik/synthesis, (printed Jan. 24, 2001).
"Hadifix," *Institute of Communications Research and Phonetics*, University of Bonn, Germany, http://www.ikp.uni-bonn.de/~tpo/Hadifix.en.html, (printed Aug. 10, 2001).
"IBM Voice Systems," http://www-4.ibm.com/software/speech, (printed Jul. 30, 2001).
"Speech Technology," *Microsoft Research*, http://research.microsoft.com/srg/, (printed Jul. 30, 2001).
"Fluet," *NTT Communication Science Laboratories*, http://www.kecl.ntt.co.jp/research/index.html, (printed Aug. 10, 2001).
OGI-Festival, http://cslu.cse.ogi.edu/tts/main.html, (printed Jul. 30, 2001).
Fister, Beat, "The SVOX Text-to-Speech System," Computer Engineering and Networks Laboratory, *Swiss Federal Institute of Technology*, Zurich, Sep. 1995, http://www.tik.ee.ethz.ch/~spr/SPGinfo/node11.html, Pfi95, 4 pages.
"Magic Voice," Samsung AIT HCI Lab., http://hci.sait.samsung.co.kr.mvoice, (printed Jul. 30, 2001).
"About Say . . . " http://wwwtios.cs.utwente.nl.say/about_say.html, (printed Aug. 10, 2001).
"Speechsynthesis: the Multilingual Text-to-Speech System from Gerhard-Mercator-University Duisburg," http://sun5.fb9-ti.uni-duisburg.de/demos/speech.html, (printed Jul. 30, 2001).
Cohen, P.R., "The Role of Natural Language in a Multimodal Interface," *Proceedings of the First Annual ACM Symposium on User Interface Software and Technology*, 1992, pp. 143-149.
Thórisson, K.R., "Gandalf: An Embodied Humanoid Capable of Real-time Multimodal Dialogue with People," *Proceedings of the First International Conference on Autonomous Agents*, 1997, pp. 536-537.

Greenberg, S., "Teaching Human Computer Interaction to Programmers," vol. 3, No. 4, *ACM Interactions*, Jul.-Aug. 1996, ACM Press. pp. 62-76.

Baker, B. (Sep. 1982). "Minspeak: A Semantic Compaction System that Makes Self-Expression Easier for Communicatively Disabled Individuals," *Byte*, 7, pp. 186-202.

Baker, B. (1986). "Using Images to Generate Speech," *Byte*, 11, pp. 160-168.

Bruno, J. (1989). "Customizing a Minspeak system for a Preliterate Child: A Case Example," *Augmentative and Alternative Communication*, 5, pp. 89-100.

Deegan, S. (Jun. 1993). "Minspeak: A Powerful Encoding Technique," *Communicating Together*, 11(2) pp. 22-23.

* cited by examiner

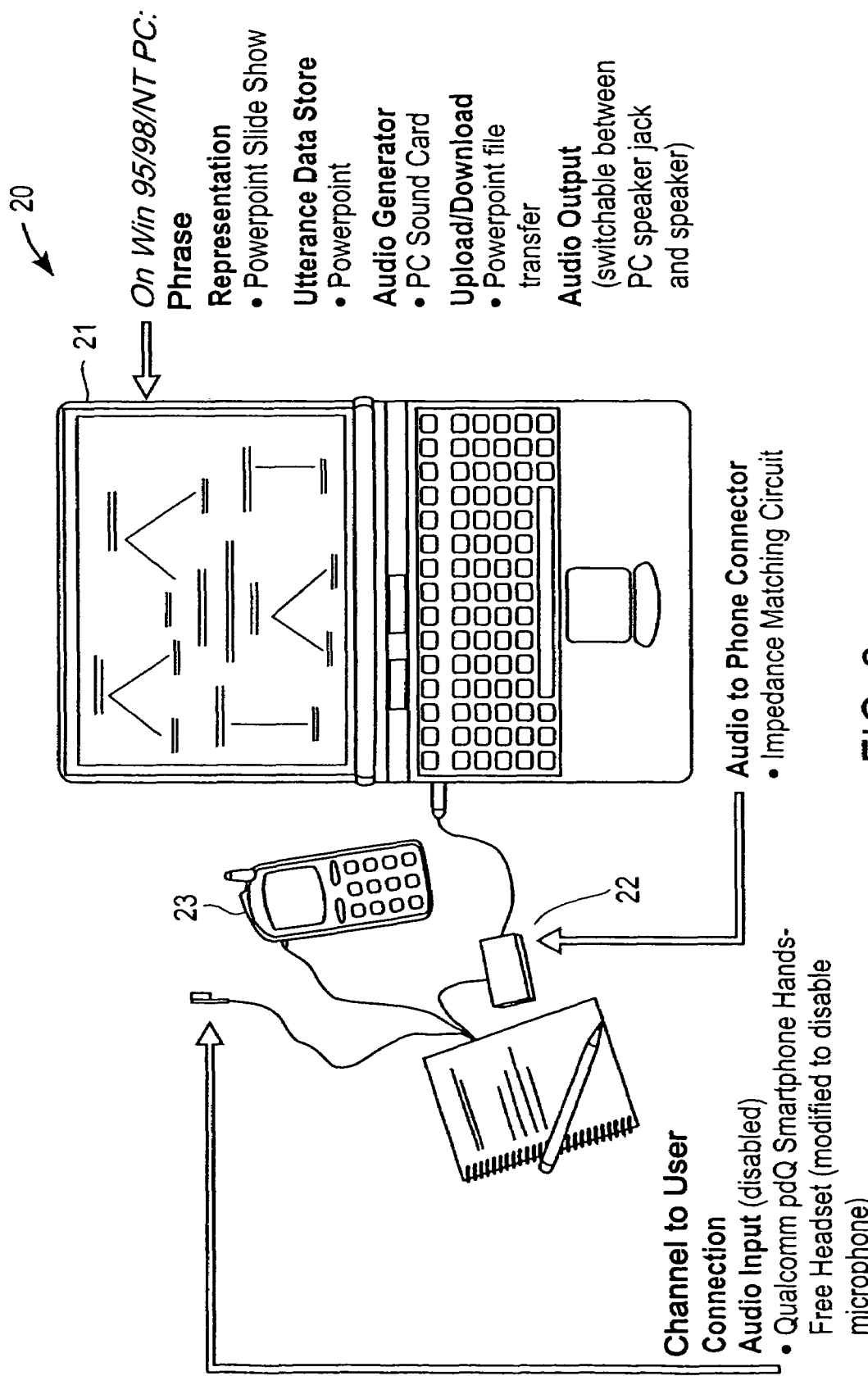

Paper UI Version

MULTI-CHANNEL QUIET CALLS

FIELD OF THE INVENTION

The present invention relates to telecommunications.

CROSS-REFERENCES TO RELATED APPLICATIONS

The following co-pending U.S. patent applications are assigned to the assignee of the present application, and their disclosures are incorporated herein by reference:

Ser. No. 09/657,370 filed Sep. 8, 2000 by Lester D. Nelson, and originally entitled, "A METHOD FOR GENERATING CONVERSATION UTTERANCES TO A REMOTE LISTENER IN RESPONSE TO A QUIET SELECTION CALL", issued as U.S. Pat. No. 6,941,342, issued Sep. 6, 2005, entitled, "METHOD FOR GENERATING CONVERSATION UTTERANCES TO A REMOTE LISTENER IN RESPONSE TO A QUIET SELECTION".

Ser. No. 09/658,673 filed Sep. 8, 2000 by Lester D. Nelson, and originally entitled, "A PERSONAL DIGITAL ASSISTANT FOR GENERATING CONVERSATION UTTERANCES TO A REMOTE LISTENER IN RESPONSE TO A QUIET SELECTION", issued as U.S. Pat. No. 6,823,184, issued Nov. 23, 2004, entitled. "PERSONAL DIGITAL ASSISTANT FOR GENERATING CONVERSATION UTTERANCES TO A REMOTE LISTENER IN RESPONSE TO A QUIET SELECTION".

Ser. No. 09/658,243 entitled "A PERSONAL COMPUTER AND SCANNER FOR GENERATING CONVERSATION UTTERANCES TO A REMOTE LISTENER IN RESPONSE TO A QUIET SELECTION, " issued as U.S. Pat. No. 7,013,279, issued Mar. 14, 2006, entitled "PERSONAL COMPUTER AND SCANNER FOR GENERATING CONVERSATION UTTERANCES TO A REMOTE LISTENER IN RESPONSE TO A QUIET SELECTION".

Ser. No. 09/658,612 filed Sep. 8, 2000 by Lester D. Nelson and Sara Bly, and originally entitled, "A TELEPHONE ACCESSORY FOR GENERATING CONVERSATION UTTERANCES TO A REMOTE LISTENER IN RESPONSE TO A QUIET SELECTION," issued as U.S. Pat. No. 7,106,852 on Sep. 12, 2006, entitled, "TELEPHONE ACCESSORY FOR GENERATING CONVERSATION UTTERANCES TO A REMOTE LISTENER IN RESPONSE TO A QUIET SELECTION."

Ser. No. 09/658,245 filed Sep. 8, 2000 by Lester D. Nelson, Daniel C. Swinehart, and Tomas Sokoler, and originally entitled, "A TELECOMMUNICATIONS INFRASTRUCTURE FOR GENERATING CONVERSATION UTTERANCES TO A REMOTE LISTENER IN RESPONSE TO A QUIET SELECTION," issued as U.S. Pat. No. 7,286,649 on Oct. 23, 2007, entitled, "TELECOMMUNICATIONS INFRASTRUCTURE FOR GENERATING CONVERSATION UTTERANCES TO A REMOTE LISTENER IN RESPONSE TO A QUIET SELECTION."

BACKGROUND

Telecommunication infrastructures provide the ability to converse with a party and be notified of other incoming calls, (i.e. "call waiting"). In addition to being notified of incoming calls, individuals can place an existing call on hold and transfer to another call, or set up conference calls and simultaneously converse and hear multiple parties at the same time.

The ability to be notified of incoming calls (i.e. call waiting) has some negative aspects. For example, when a party is conversing on one call ("call 1") and they are notified of a second incoming call ("call 2") they must either place the exiting conversation on hold and switch to the other call or ignore the incoming call altogether. Typical responses to the incoming call are "I'm on the other line, can you wait a minute?" or "I'm on the other line, I'll call you back." Once they have informed the incoming call or of their situation they then return to the original call.

Conference calls also have some negative aspects. For example, during a conference call including caller A, Caller B, and Caller C, each caller can hear the conversation of each of the other callers. Currently, there is no way for Caller A to speak privately with Caller B so that Caller C cannot hear the conversation unless he contacts him using another telephone connection.

Therefore, there is a desire to provide a system and method for transmitting information to other callers without interrupting an existing conversation. Additionally, there is a desire to provide a system and method for mixing audio from multiple telephone connections for a party to hear simultaneously while being able to converse with only selected individuals.

SUMMARY OF INVENTION

Embodiments of the present invention allow people to converse with at least one party while concurrently relaying information to other parties on other channels.

The invention, roughly described, comprises a method for communicating over multiple channels. The method may include the steps of communicating over a first channel, selecting a second channel, selecting a phrase and obtaining an internal representation of a phrase element associated with the selected phrase. Once a phrase has been selected, an audible utterance is generated based on the internal phrase element that is provided over the selected second channel.

In one aspect, the invention comprises a multi-channel telecommunication system. The multi-channel telecommunication system includes an audio input, a channel representation, and a phrase representation. The channel and phrase representation are stored on memory. A phrase element associated with the phrase representation wherein the phrase element has an internal representation of an audible utterance may also be stored in the memory. A processor coupled to the audio input, display and memory, provides a first control signal and a second control signal, and an audio generator generates an audible utterance responsive to the first control signal and the conversation element. A channel selector coupled to the processor and audio generator, selects a channel responsive to the second control signal and provides the audible utterance over the selected channel.

In a further aspect, the system may comprise a plurality of input channels a processing device for storing an internal representation of a phrase element and a scanning device, coupled with the processing device, for reading a first code associated with the phrase element and for reading a second code associated with at least one of said input channels. The processing device provides an audible utterance over the channel associated with said second code in response to reading the first code and the second code.

In yet another aspect, the invention comprises a general purpose computing device, such as personal digital assistant, a laptop, personal computer, etc. The general purpose computing device may include a display, displaying a channel representation and a phrase representation, and a memory for storing the channel representation, phrase representation and a phrase element associated with the phrase representation.

The phrase element has an internal representation of an audible utterance. A processor, coupled to the display and memory, generates a first control signal responsive to selection of the channel representation and a second control signal response to selection of the phrase representation. An audio generator, coupled to the processor and memory, generates an audible utterance responsive to the second control signal and the phrase element and a channel selector, coupled to the processor and audio generator, activates a channel responsive to the first control signal and provides the audible utterance over the selected channel.

A further aspect of the invention comprises a telecommunication infrastructure. The infrastructure may include a first electronic device, coupled to the telecommunication infrastructure over a first channel, a second electronic device, coupled to the telecommunication infrastructure over a second channel, and a third electronic device, coupled to the telecommunication infrastructure. The third electronic device is used for selecting the first channel or the second channel and selecting a phrase representation. A processing device, coupled to the telecommunication infrastructure, stores a phrase element associated with the phrase representation, and a software program for providing an audible utterance over the selected first or second channel in response to a selected phrase representation.

In a further aspect, the invention comprises a method for communicating with a plurality of recipients over a plurality of channels. The method may comprise the steps of communicating over a first channel with a first recipient, receiving an indication over a second channel of a second recipient, selecting a channel for generating an audible utterance selecting a phrase representation, and generating an audible utterance over the selected channel based on the selected phrase representation.

BRIEF DESCRIPTION OF THE DRAWINGS

FIG. 2 illustrates a Multi-Channel Quiet Call personal computer ("PC"), according to an embodiment of the present invention;

DETAILED DESCRIPTION

I. Overview

The method and system described herein (generally known as "Multi-Channel Quiet Calls" or "Multi-Channel Quiet Call technology") provides the ability for a participant to deal concurrently with multiple communication channels (e.g., two or more telephone calls). All participants are allowed to continue using audible technology (e.g., a telephone) over normal telecommunication infrastructures. Embodiments of the present invention transform a user's silent input selections into equivalent audible signals that may be directly transmitted to a recipient on a specific communication channel.

Figure 1:
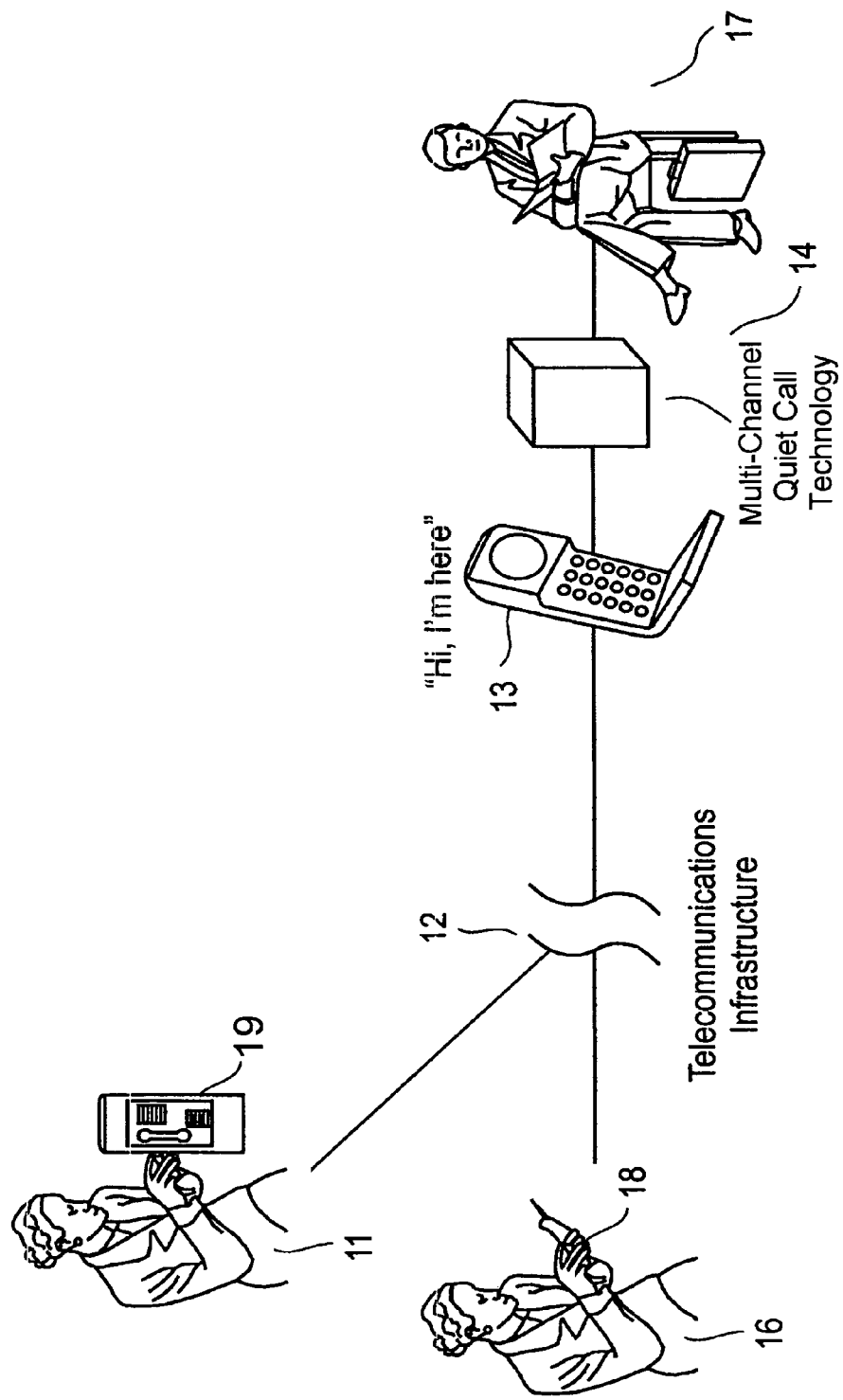
FIG. 1 illustrates a simplified block diagram of a Multi-Channel Quiet Call system, according to an embodiment of the present invention.

An embodiment of a Multi-Channel Quiet Call system is illustrated in FIG. 1. The Multi-Channel Quiet Call system may include a first individual 11, a second individual 16, and a third individual 17. Individual 16 attempts to communicate with individual 17 over telecommunication infrastructure 12. Specifically, individual 16 uses a telephone 18 to dial a telephone 13 of individual 17.

While individual 16 is communicating with individual 17, individual 11 attempts to communicate with individual 17 over telecommunication infrastructure 12. Specifically, individual 11 uses a telephone 19 to dial the telephone 13 of individual 17. Multi-Channel Quiet Call technology 14 allows individual 17 to relay audible information to individual 11 without interrupting the conversation being conducted with individual 16.

A. Advantages

The present embodiments of the invention have at least the following advantages for both placing and receiving multiple telephone calls. First, an individual can concurrently interact over multiple communication channels. Non-audible input operations (pressing a key or button, touching a display) are translated into appropriate audio phrases and relayed to a designated recipient or recipients.

Second, the relayed phrase is conducted audibly for the recipients.

Third, the phrases permitted are expressive. Expressive representations for different kinds of phrases may be defined (e.g., lists of phrases suitable for greetings and answering incoming calls—"Hello, I'll be right there," "Hello, I cannot talk now, please leave a message," etc. Phrase structures may be predefined, recorded as needed, or synthetically generated on demand (e.g., text-to-speech).

Fourth, the communication interface is easy to use when a user is engaged in other calls or activities. The interface includes channel and phrase representations so that they may be easy to recognize (e.g., icon, text label) and invoke (e.g., point and click). The phrase representations maybe grouped into any type of organizational structure, or left ungrouped. For example, the phrase representations may be grouped by individuals (e.g.: indexed by caller identification), by category (e.g.: greetings, information, goodbyes), etc.

Fifth, the communication interface is situation-appropriate. The interface is designed to fit unobtrusively into different situations (e.g., a pen interface for an individual, a control panel for a receptionist, etc.).

Sixth, embodiments of the present invention operate within an existing communication infrastructure. An embodiment uses available resources that an individual is likely to have (e.g., PC, PDA, data-capable cellular telephone) and/or adding low-cost components to assist in the transformations. The interface may be implemented on a wide variety of hardware that are interchangeable during or between calls and interoperable with each other over existing communication channels.

Seventh, embodiments of the present invention may be used concurrently with a "Quiet Call system." An example of such a quiet call system is described in above incorporated co-pending U.S. patent application Ser. No. 09/657,370 entitled "A METHOD FOR GENERATING CONVERSATION UTTERANCES TO A REMOTE LISTENER IN RESPONSE TO A QUIET SELECTION," Ser. No. 09/658,243 entitled "A PERSONAL COMPUTER AND SCANNER FOR GENERATING CONVERSATION UTTERANCES TO A REMOTE LISTENER IN RESPONSE TO A QUIET SELECTION," Ser. No. 09/658,673 entitled "A PERSONAL DIGITAL ASSISTANT FOR GENERATING CONVERSATION UTTERANCES TO A REMOTE LISTENER IN RESPONSE TO A QUIET SELECTION," Ser. No. 09/658,612 entitled "A TELEPHONE ACCESSORY FOR GENERATING CONVERSATION UTTERANCES TO A REMOTE LISTENER IN RESPONSE TO A QUIET SELECTION," and Ser. No. 09/658,245 entitled "A TELECOMMUNICATIONS INFRASTRUCTURE FOR GENERATING CONVERSATION UTTERANCES TO A REMOTE LISTENER IN RESPONSE TO A QUIET SELECTION.

Eighth, according to an embodiment, audio input from multiple channels maybe mixed so an individual can simultaneously monitor more than one channel. For example, if an individual is on hold and an incoming call is received, audio from the two calls can be mixed and the individual can conduct a conversation and simultaneously monitor the progress of the call on hold. Alternatively, a graphical representation of audio on a second channel can be visually displayed to a user.

B. A Multi-Channel Quiet Call Example

Amy, a receptionist at a law firm, is conducting her daily routine of receiving incoming calls and routing them to various attorneys, staff, and other office personnel.

Early that morning Bob, a client of the firm, calls wanting to speak to Chad, an associate attorney at the firm, regarding a very important case that Chad has been handling for Bob. Just as Amy is answering Bob's phone call, a second call from Dennis is received. Dennis, a senior partner at the firm, is currently in an arbitration meeting and is at critical decision point and needs to speak with another attorney at the office to clarify a particular issue. Amy knows that she can take the first call from Bob and concurrently communicate to the second caller, Dennis, that she will be with him in just a moment using the Multi-Channel Quiet Call System.

As Amy takes the first call, with her well-rehearsed greeting, "Thank you for calling the X,Y,Z firm, how may I direct your call," she also directs to Dennis, with a click of a button, the verbalized greeting "Thank you for calling the X,Y,Z firm, I will be with you in a moment." Once Amy has directed the call from Bob to Chad's office she then switches to Dennis and directs his call to Eugene, an available attorney who has been helping Dennis prepare for the arbitration. A Multi-Channel Quiet Call system allows Amy to quickly defer an incoming call while simultaneously conversing on another call.

During the conversation between Bob and Chad, they reach an agreement as to a settlement amount Bob is willing to pay to have his case settled. Chad informs Bob that before they present the offer he would like to conduct a limited amount of research, which might result in reducing the amount needed to settle. Chad ends the conversation promising to contact Bob as soon as possible with the results of his research.

As Bob is awaiting the return telephone call from Chad, he decides to call his bank to ensure that he has a sufficient amount of cash on hand to complete the deal. As is typical, Bob is placed on hold by his bank and is subjected to the bank's soothing background music. As Bob is holding with the bank he receives the promised return call from Chad. Instead of either letting Chad's call go to voice-mail or taking the call and risk missing the opportunity to speak to a live individual at the bank, Bob knows that he can converse with Chad and continue to listen for a live person to answer his call at the bank using his Multi-Channel Quiet Call System. Bob accepts Chad's call and selects to mix the audio from both calls so that if a person picks up on the call to the bank, he can quickly switch conversations. A Multi-Channel Quiet Call System allows Bob to monitor multiple channels at the same time while conversing over one of the channels.

As Chad is informing Bob that his search proved beneficial and that the amount Bob is likely to owe should be reduced by half, a representative from the bank suddenly takes Bob's call to the bank off hold. Knowing that the conversation must change quickly or the bank representative may either return him to the hold queue or disconnect him completely, Bob, with a few strokes of an electronic pen over a barcode, sends a verbalized message to the bank representative that they will get immediate attention, while he concurrently informs Chad that their conversation must conclude. Once Bob has thanked Chad for his assistance and instructed him to prepare the settlement agreement, he ends the call and switches to the bank representative and transfers the necessary money into his account. A Multi-Channel Quiet Call System allows Bob to quickly switch from one conversation to another.

Late that evening, as Chad is preparing the settlement agreement on his computer, the computer suddenly takes control, shuts off the screen and begins to beep loudly, disrupting the few remaining late working attorneys. After unsuccessfully attempting to remedy the problem, Chad, knowing he must complete the settlement agreement by morning, reluctantly calls the computer manufacturer's technical support line and begins to press buttons in response to the automated questions. Frustrated and confused, Chad soon becomes lost in the maze of automated queries. Chad, knowing that the computer company utilizes a Multi-Channel Quiet Call System to oversee customers as they travel through the automated system, sends out a verbal cry for help.

In response to Chad's cry for help, a technician, already alerted to Chad's situation due to his constant restarting of messages, directs verbal assistance into the line using Multi-Channel Quiet Call Technology and directs him to his desired query. A Multi-Channel Quiet Call System allows the computer manufacturer to audibly oversee multiple customers by mixing audio channels and/or by viewing a site map or graph of the automated system and positions of individuals within the system. Using a Multi-Channel Quiet Call system, the computer manufacturer can provide guidance to customers who become lost or confused as they travel through their automated system.

II. A Multi-Channel Quiet Call System

A Multi-Channel Quiet Call system as described herein is an electronically assisted relay of information (e.g., telephone calls) between three or more parties that has the following attributes:

At least one party is in a multiple-contact situation. For example, a receptionist may be in contact with two incoming telephone calls; an individual holding on one call listening to background music while simultaneously conversing verbally on a second call; an operator audibly overseeing several calls as they progress through an automated system; a voice dispatcher (e.g., taxi cab dispatcher) sending out information to multiple parties; etc.

The parties in the multiple-contact situations use an alternative, quiet mode of discussion (e.g., keyboard, buttons, touchscreen, etc.) to produce audible phrases that are transformed into an equivalent electronic representation and directed and transmitted to other parties over one or more channels.

The parties in the multiple-contact situations can select which parties receive the equivalent electronic representation of the phrase that is being transmitted.

The term Multi-Channel Quiet Call technology is used herein to signify the communication mechanism, including hardware and/or software, that allows people in multiple-contact situations to communicate easily and expressively with two or more parties at the same time, and/or audibly monitor two or more channels at the same time. A multi-channel quiet call is conducted using this technology.

In an embodiment of the present invention, two Multi-Channel Quiet Call modes of operation are defined: (A) Conducting a Multi-Channel Quiet Call, and (B) Preparing for a Multi-Channel Quiet Call.

A. Conducting a Multi-Channel Quiet Call

Figure 3A:
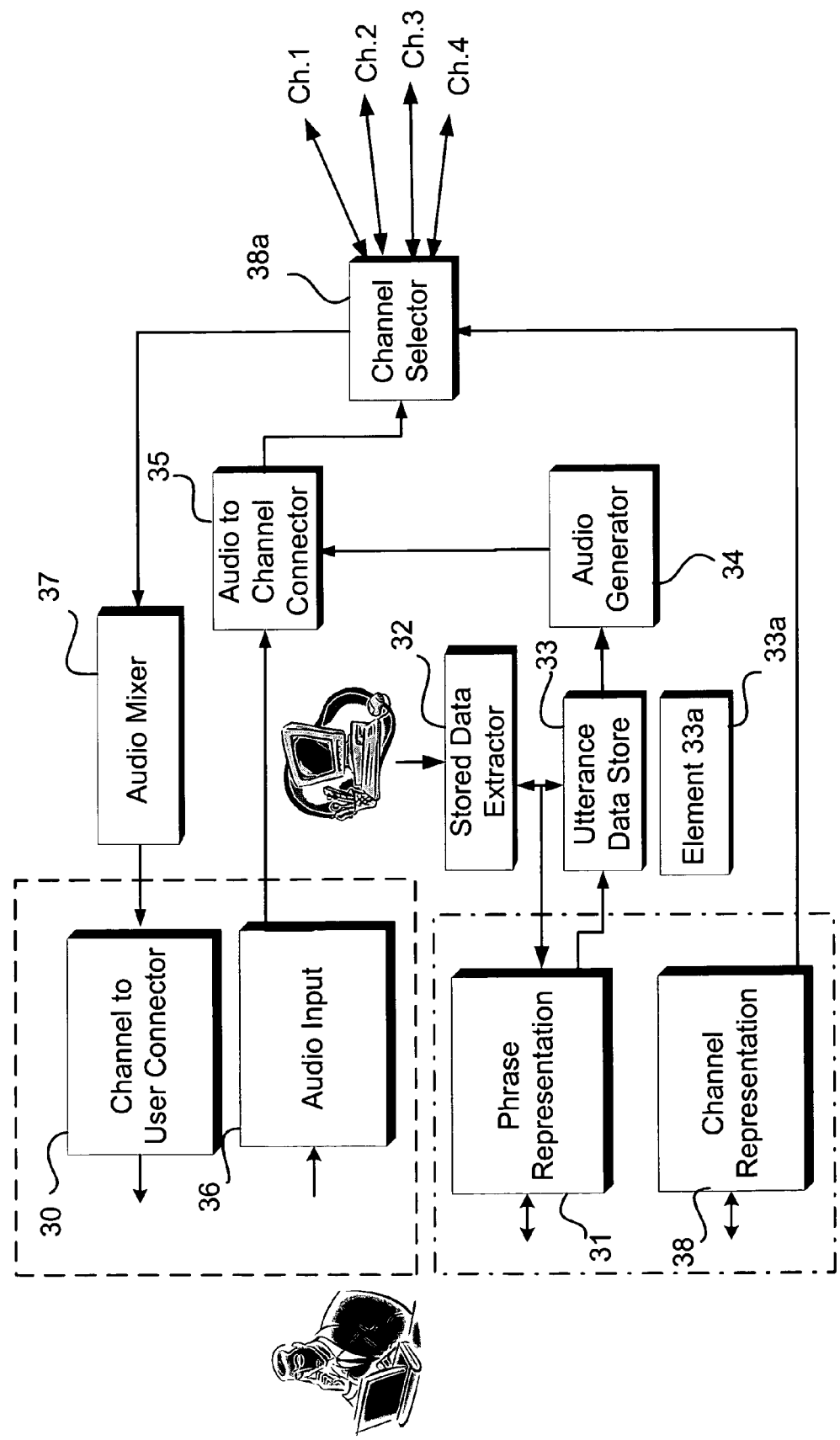
FIG. 3A illustrates a simplified block diagram of conducting a conversation with a Multi-Channel Quiet Call system, according to an embodiment of the present invention.

FIG. 3A is a simplified block diagram of the components structure in a Multi-Channel Quiet Call system embodiment used for conducting a multi-channel quiet call. In this mode, a user conducts a voice conversation over one channel while at the same time engaging audibly on another channel with no audible feedback into other channels. Additionally, in this mode a user may monitor audio on multiple channels while optionally conversing on one or more of the channels.

Figure 7:
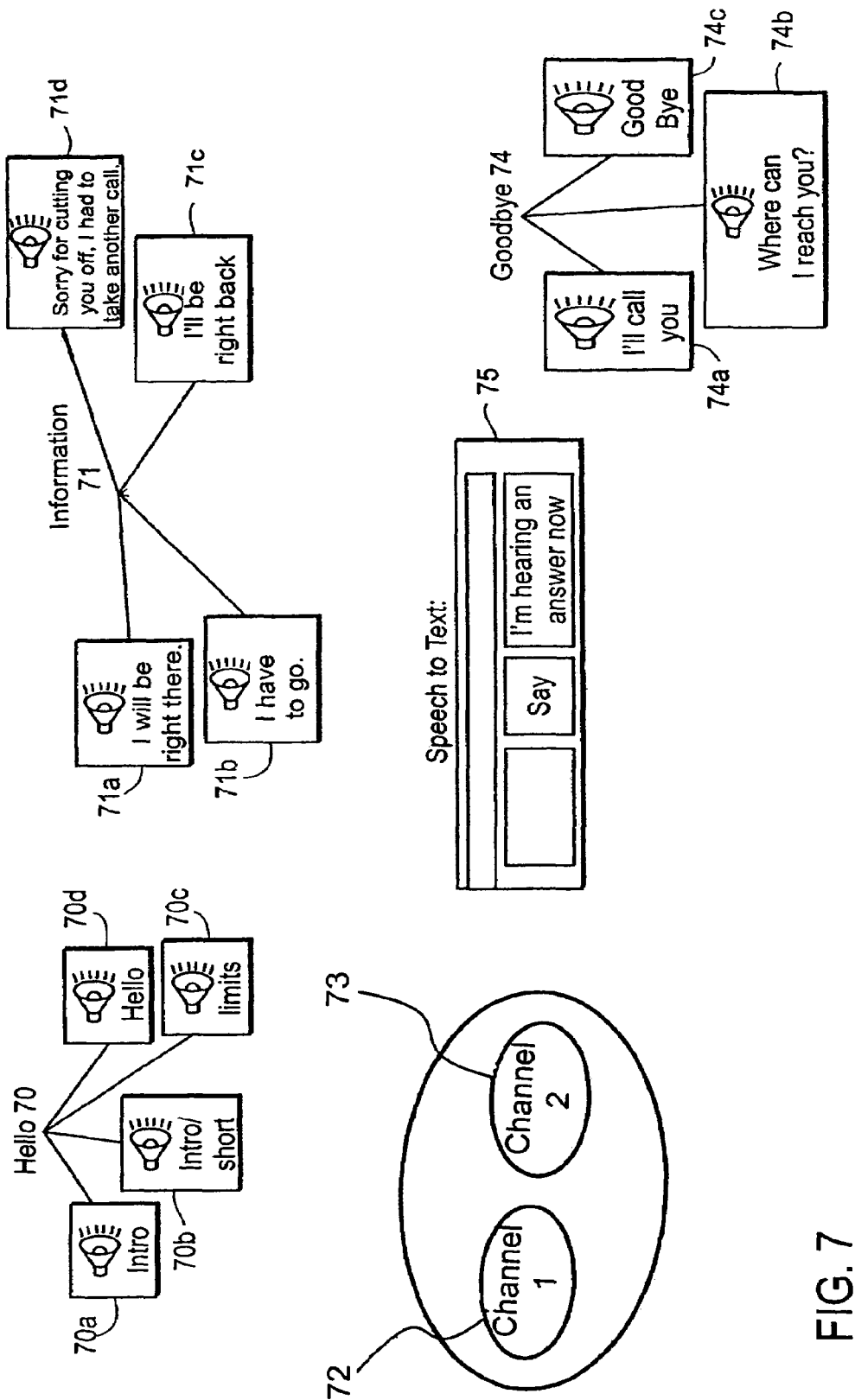
FIG. 7 illustrates a Multi-Channel Quiet Call graphical user interface ("GUI"), according to an embodiment of the present invention.
Figure 19:
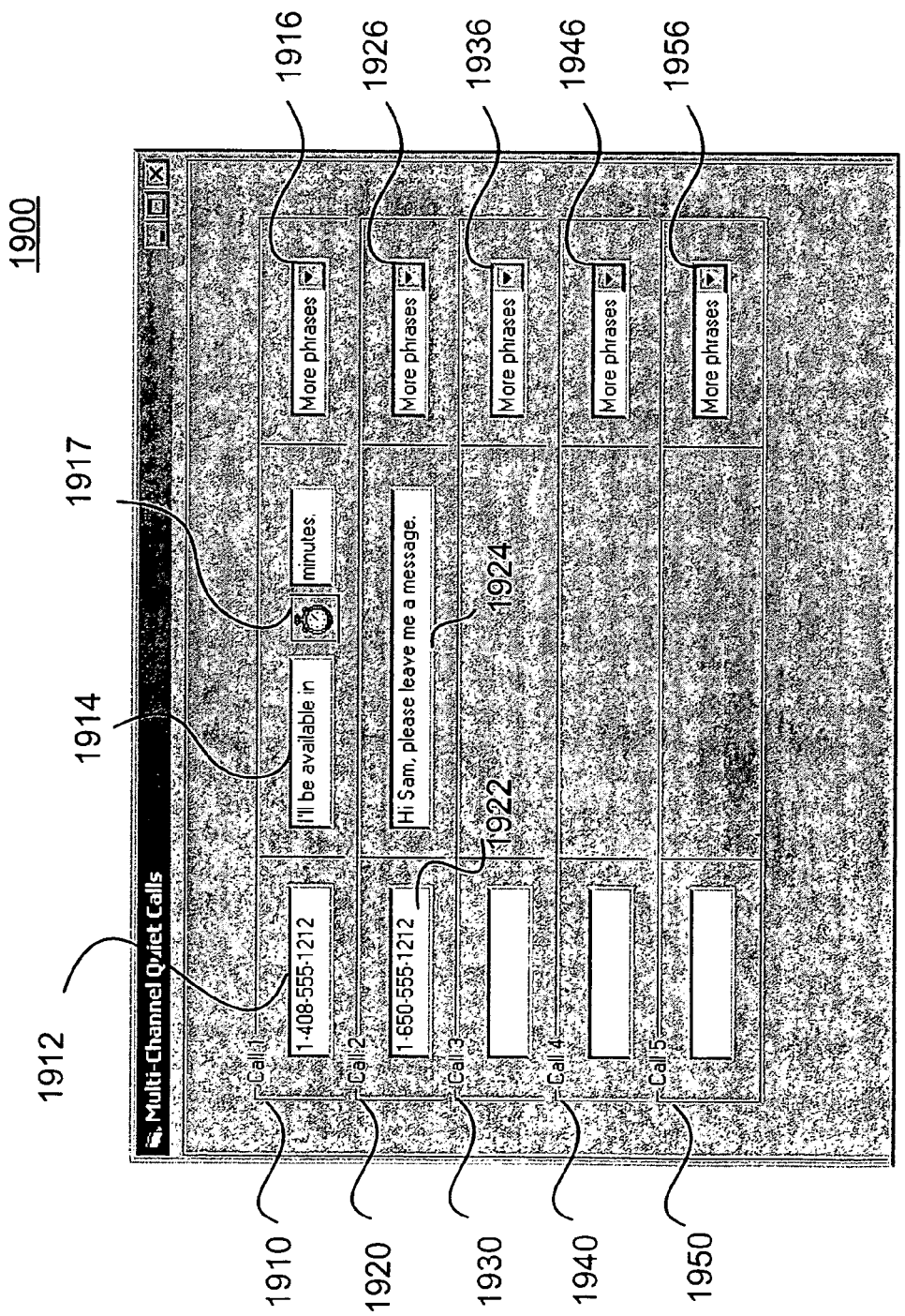
FIG. 19 illustrates a Graphical User Interface of channel representation and phrase representation, according to an embodiment of the present invention.

A user views a channel representation 38 and phrase representation 31, as illustrated by blocks 38 and 31 in FIG. 3A, respectively, and makes selections about which channels will receive a selected utterance and which utterance will be transmitted over the selected channels. In an embodiment, channel representation 38 and phrase representation 31 may be icons having text labels as illustrated in FIG. 7. In another embodiment, channel representation 38 and phrase representation 31 may be viewed using a graphical user interface as illustrated in FIG. 19.

A Channel Selector 38a associated with channel representation 38 in response to user input activates which channels are to receive an electronically generated utterance and controls which channels the user is verbally conversing over. Additionally, channel selector selects multiple channels for mixing the audio using audio mixer 37 so a user can monitor audio of multiple channels simultaneously. In an embodiment, channel selector 38a may be hardware, such as a mechanical switch, or a software routine for selecting a desired channel.

A Phrase Element 33a associated with phrase representation 31 is stored in an utterance data store 33, that when selected is retrieved and submitted to an audio generator 34 to produce the electrical output signals needed for communication. Audio-to-channel connector 35 provides this electrical output signal which is then routed to the appropriate channels through channel selector 38a.

A channel-to-user connector 30 allows the user to monitor the selected channels and hear the party they are conversing with. For example, channel-to-user connector 30 may be an earpiece, a speaker, or any other audio output device.

An audio input 36 allows a user to voice into the active conversation channel.

In an embodiment, a stored data extractor 32 may be included in the system which converts data stored in other formats (e.g., PC calendar entries, address books) into a format suitable for audio generation.

Figure 3B:
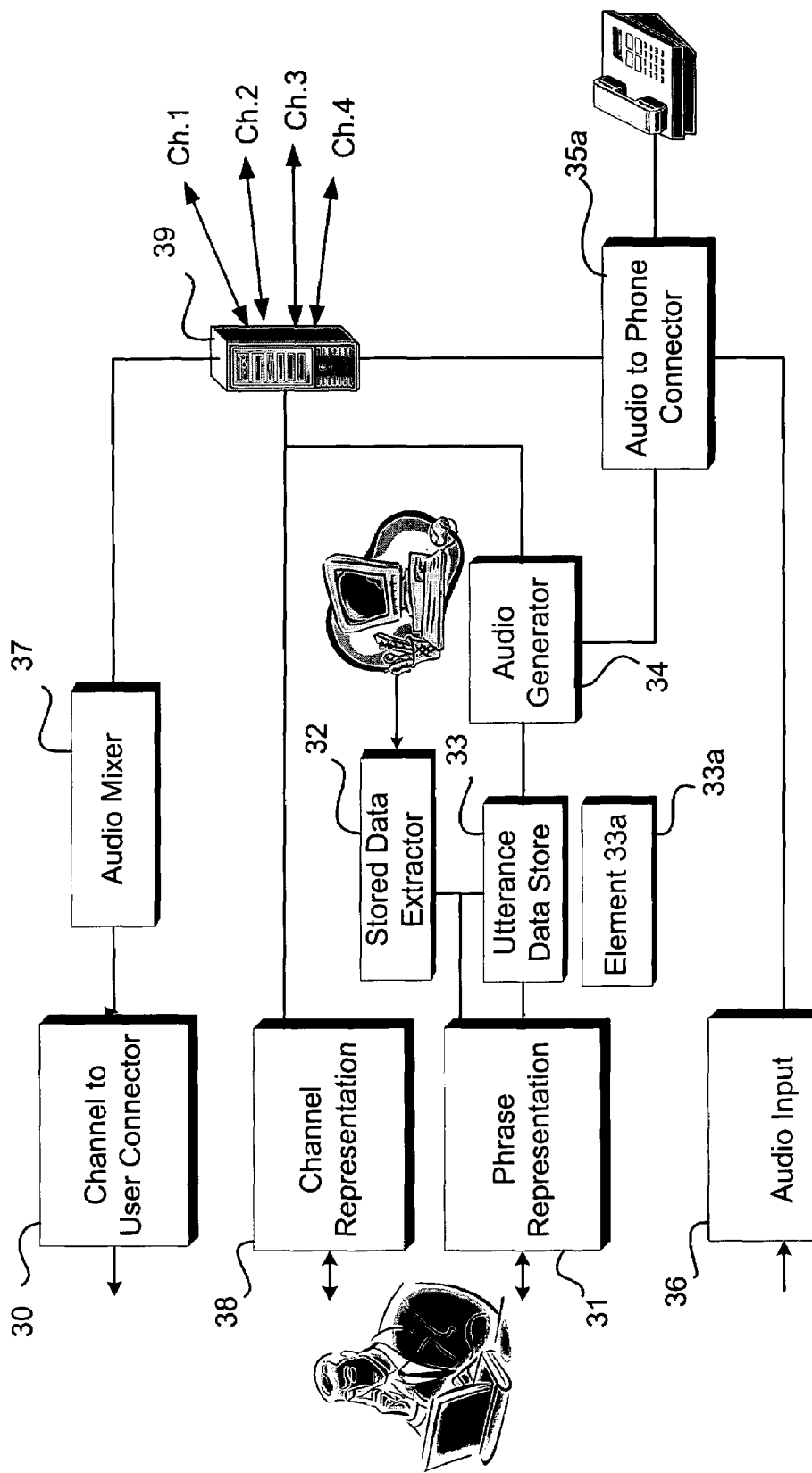
FIG. 3B illustrates a simplified block diagram of conducting a conversation with a Multi-Channel Quiet Call system, according to an embodiment of the present invention.

FIG. 3B is a simplified block diagram illustrating an alternative components structure of a Multi-Channel Quiet Call system embodiment used for conducting a multi-channel quiet call. The embodiment illustrated in FIG. 3B utilizes a telephony processor 39 to transmit information over various channels and mix audio from incoming channels. A telephony processor may be utilized with existing systems which does not support the functions of selecting channels or mixing audio. Channel selection is made through telephony processor 39 using commands sent to the telephony processor by a user (e.g. switch channels, mix audio channels, answer, hang-up, etc.). These commands may be selected using channel representation 36.

Alternatively, in an embodiment, any one of, or all of utterance data store 33, associated element 33a, stored data extractor 32, audio generator 34, and audio mixer 37 may be incorporated into telephony processor 39. In an embodiment having utterance data store 33 and audio generator 34 incorporated in telephony processor 39 a user selects phrases using phrase representation 31 and the information is relayed to telephony processor which generates the appropriate electrical representation of the selected phrase over selected channels.

The following describes components in a Multi-Channel Quiet Call system embodiment.

i. Multi-Channel Quiet Call System Components a. Channel Representation

A channel representation 38 of a channel selector 38a which activates the channels for receiving utterances and/or mixing audio of incoming channels is displayed to a user. An example of a Channel representation GUI is illustrated in FIG. 7. Another example of a channel representation GUI is illustrated in FIG. 19.

Channel representation 38 may take any form that allows a user to interface with channel selector 38a and select a desired channel or channels, including graphical (e.g., icons, symbols, figures, graphs, checkboxes, buttons, other GUI widgets, and sequences and/or a combination thereof), textual (e.g., displayed text, labeled input forms, and sequences and/or combinations of the above), and physical (e.g., buttons, switches, knobs, labels, barcodes, glyphs, Braille or other tangible representation, electronic tags, and sequences and/or a combination thereof).

A user interacts silently with channel representation 38 by inspecting it according to its kind (e.g., visually or tactually) and invoking it according to its kind (type, point and click, press, eye tracking, scanning, etc.).

Channel representation 38 may be presented using one or more display surfaces (e.g., computer display, touchscreen, paper, physical device, etc.) or display forms (e.g., pages, frames, screens, etc.). When multiple surfaces or forms are used these may be organized in different ways according to user needs (sequentially, hierarchically, graph-based, unordered, etc.). A user selects between different surfaces or forms according to its kind (e.g., GUI selection, physical manipulation such as flipping or turning, button press, etc.).

b. Channel Selector

Channel selector 38a activates which channels are to receive an electronic representation of a selected phrase while simultaneously maintaining a connection between the user and the channel they are conversing on. Additionally, channel selector may activate which channels are to have their audio mixed using audio mixer 37 for simultaneous listening by a user. Channel selector 38a may select one, two, all, or any other combination of channels for audio mixing.

Channel selector 38a may transmit utterances over selected channels while a user continues conversing on another channel in numerous ways. For example, channel selector maybe a mechanical device, such as a series of switches which keep an audio channel between the user and the party they are conversing with active while simultaneously activating other audio channels for transmission of a selected phrase. In an embodiment, the transmitted phrase is not transmitted over the conversing channel.

In an embodiment, channel mixing is performed by a user sending commands via channel representation 38 to channel selector 38a. Channel selector 38a activates the selected channels and the incoming audio is mixed by audio mixer 37 and sent to channel to user connector 30 for audible listening by a user.

c. Phrase Representation

Phrase representation 31 of a phrase element 33a (i.e., phrases, words, letters, numbers, symbols, sound effects, and sequences and/or a combination thereof) that a user may invoke for initiating phrase utterances is displayed to a user. An example of a phrase representation GUI is illustrated in FIG. 7. Another example of a phrase representation GUI is illustrated in FIG. 19.

A phrase representation 31 may take any form that does not require a user to vocalize a selection of a phrase element 33a, including graphical (e.g., icons, symbols, figures, graphs, checkboxes, buttons, other GUI widgets, and sequences and/or a combination thereof), textual (e.g., displayed text, labeled input forms, and sequences and/or combinations of the above), and physical (e.g., buttons, switches, knobs, labels, barcodes, glyphs, Braille or other tangible representation, electronic tags, and sequences and/or a combination thereof).

A user interacts silently with each phrase representation 31 by inspecting it according to its kind (e.g., visually or tactually) and invoking it according to its kind (type, point and click, press, eye tracking, scanning, etc.).

Phrase representation 31 may be presented using one or more display surfaces (e.g., computer display, touchscreen, paper, physical device, etc.) or display forms (e.g., pages, frames, screens, etc.). When multiple surfaces or forms are used these may be organized in different ways according to user needs (sequentially, hierarchically, graph-based, unordered, etc.). A user selects between different surfaces or forms according to its kind (e.g., GUI selection, physical manipulation such as flipping or turning, button press, etc.).

A user may update a phrase element 33a and an associated phrase representation 31 in a visible display as follows. First, an individual can add a new phrase element and/or an associated phrase representation.

Second, an individual can delete a phrase element and/or an associated phrase representation.

Third, an individual can change the kinds of phrase representations of phrase elements (e.g., text, label, icon).

Fourth, an individual can change a phrase representation of a phrase element according to its kind (e.g., text values, label values, icon images).

Fifth, an individual can change a phrase element associated with one or more phrase representations.

Sixth, an individual can add, delete, or modify the association of a phrase element and its phrase representation.

Seventh, an individual can invoke upload/download commands for phrase elements, their display phrase representations, and associated internal phrase representation.

Eighth, an individual can invoke record and playback capabilities for selected phrase elements.

d. Utterance Data Store

Each phrase element (i.e., phrases, words, letters, numbers, symbols, sound effects, and sequences and/or combinations of the above) has one or more internal representations suitable for creation of audible utterances that may be communicated over an audio channel, such as a telephone line. Phrase element 33a stored in utterance data store 33 includes, for example, sound file formats, record and playback formats, text, MIDI sequences, etc. These internal representations may be stored in and retrieved from utterance data store 33. In an embodiment, utterance data store 33 is readable and writeable computer memory as known in the art. Retrieval may be accessed randomly, sequentially, by query, or through other such known methods. Data for retrieved phrase elements are passed to an audio generator 34.

e. Audio Generator

An audio generator 34 transforms the internal representations of phrase elements into audible formats suitable for transmission over an audio channel, such as a telephone connection. In an embodiment, audio generator 34 is a text-to-speech generator, sound card, sound effects generator, playback device, in combination and/or an equivalent.

f. Audio Input

Direct audio connection 36 (e.g., microphone) at the locale of the user may be used to converse over an active channel.

Audio recording into an utterance data store may be made by selecting one or more elements from the phrase representation, invoking a record command and speaking in audio input 36.

g. Audio Output

Audio output 41 allows for audio generation from an utterance data store 33 by selecting one or more elements from a conversational representation 31 and invoking a playback command. Audio output provides the ability to listen to audio when programming phrases.

h. Audio Mixing

Audio Mixer 37 mixes the audio from two or more incoming channels and streams the audio to channel to user connector 30 for output to a user. Audio may be mixed by merging audio signals from each incoming channel using hardware, software, or a combination of both. Hardware may include any means of analog or digital signal processing (e.g.: Voice-over-IP (VoIP)). Software may include software for merging of bitstreams or the combination of data through a transformation. Many transformations may be defined and any one or combination may be used. A transformation may be, for example, adjusting volume, frequency, sampling, compression, and filtering into a distinguishable audio pattern that may be interpreted as audio activity (e.g. mumbling, speaking, music, buzzing).

In an alternative embodiment, instead of mixing audio a graphical representation of audio on second channel is displayed to a user. The graphical display alerts the user, as a result of a graphical change, when the audio changes from either a hold noise (e.g.: background music) to a live person.

i. Audio-to-Channel Connector

Audio-to-channel connection is provided between user conversational inputs generated from the audio input 36 or audio generator 34 that delivers signals appropriate for telephone transmission to receiving parties. This includes direct electrical connection of signals, electronically processed signals such as an impedance matching circuit, optical to electrical conversion such as infrared detection, or muffled acoustic signals using a soundproof housing or other insulation.

Figure 5:
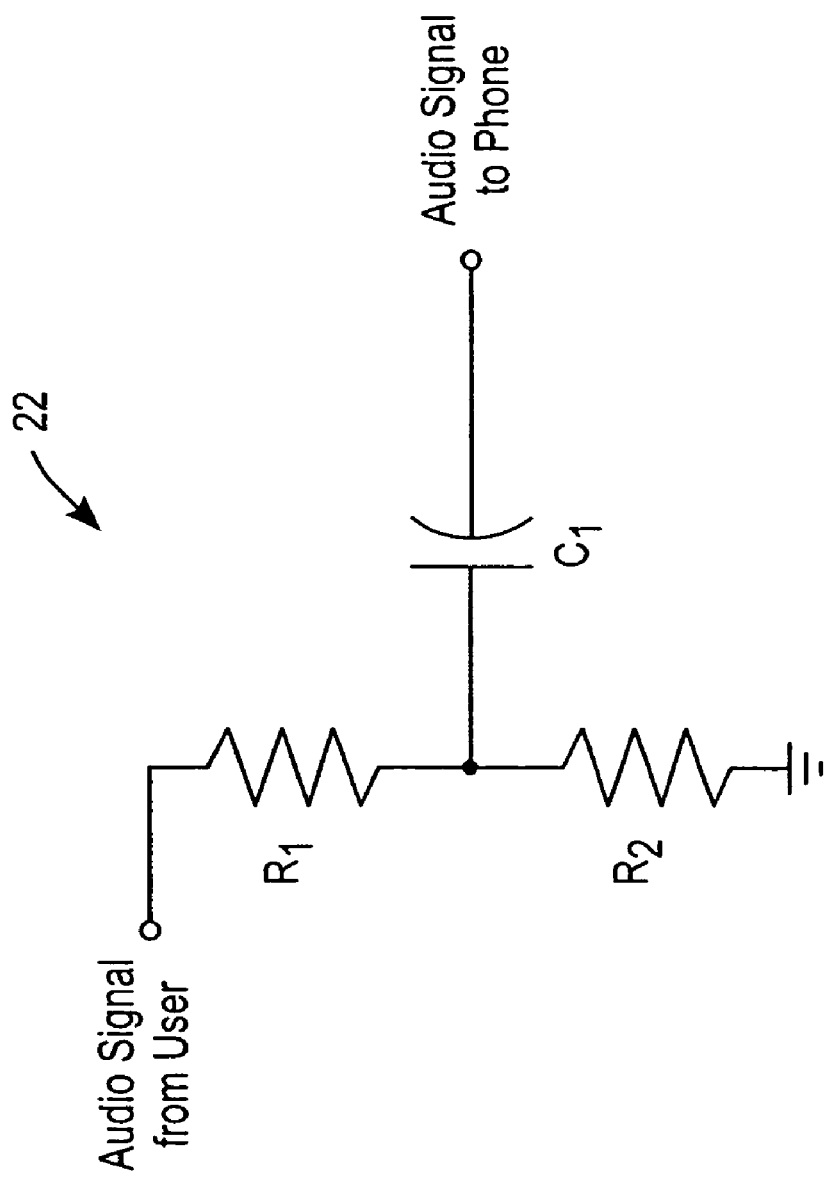
FIG. 5 is an impedance matching circuit schematic, according to an embodiment of the present invention.

FIG. 5 illustrates an impedance matching circuit 22. Resistances $R_1$ and $R_2$ are selected to match the input and output signals. The Capacitor $C_1$ eliminates some of the signal interference (voltage blanking for DC component).

j. Channel-to-User Connection

Channel-to-user connector 30 is provided from a channel selector 38a or telephony processor 39 to a user. Channel-to-user connector 30 may transmit audio from one, two, or any selected combination of channels simultaneously to a user. In an embodiment, channel-to-user connector 30 includes an earpiece or other speaker system that is connected directly to the users communication device or through some intermediate electronics (e.g., PC and soundcard).

k. Upload/Download

Data for phrase elements, their display phrase representations, associated internal representation, and display for channel representations may be uploaded and downloaded between the Multi-Channel Quiet Call system and other systems, including other Multi-Channel Quiet Call systems, external memory devices (e.g., Compact Disc ("CD"), Digital Video Disc ("DVD"), personal digital assistants), directly connected computers and networked computers (e.g., local area, wide area, Internet, wireless, etc.). Connection may be made by serial connection (RS232, IrDA, Ethernet, wireless, or other interconnections known in the art). Upon invocation of the upload command from a phrase representation 31, channel representation 38 and/or utterance data storage 33, formatted data (e.g., raw byte data, rich text format, Hypertext Markup Language, etc.), are transmitted (e.g., TCP/IP, RS-232 serial data, etc.). Upon invocation of the download command, a phrase representation 31 and/or channel representation formatted for stored data (phrase representation format, channel representation format, utterance data storage format), is sent to the appropriate Multi-Channel Quiet Call components (phrase representation 31, channel representation 38, utterance data storage 33).

l. Stored Data Extractor

Data for phrase elements, their display phrase representations, and associated internal representation may be extracted from stored information on a host computer. For example, calendar entries in a Microsoft Outlook format may be dragged from an application to a stored data extractor 32 that parses and represents the calendar data. In this case, an Appointment object is accessed and its fields interrogated (e.g., Subject, Start, etc.). Text strings are extracted from the fields and a phrase is formatted from these fields and phrase template. A template takes the form of some predefined text with slots for the appropriate data to be inserted:

"An appointment for <subject> is scheduled to start at <start>", where the slots <subject> and <start> are supplied by text from the Appointment object.

Text-to-speech generation or special-purpose, predefined audio vocabularies may then be used to vocalize the appointment information. Other types of extracted data may include address book entries, database records, spreadsheet cells, email messages, driving directions, information pointers such as path names and universal resource locators and all manner of stored, task-specific information.

B. Preparing For Multi-Channel Quiet Call

Figure 4A:
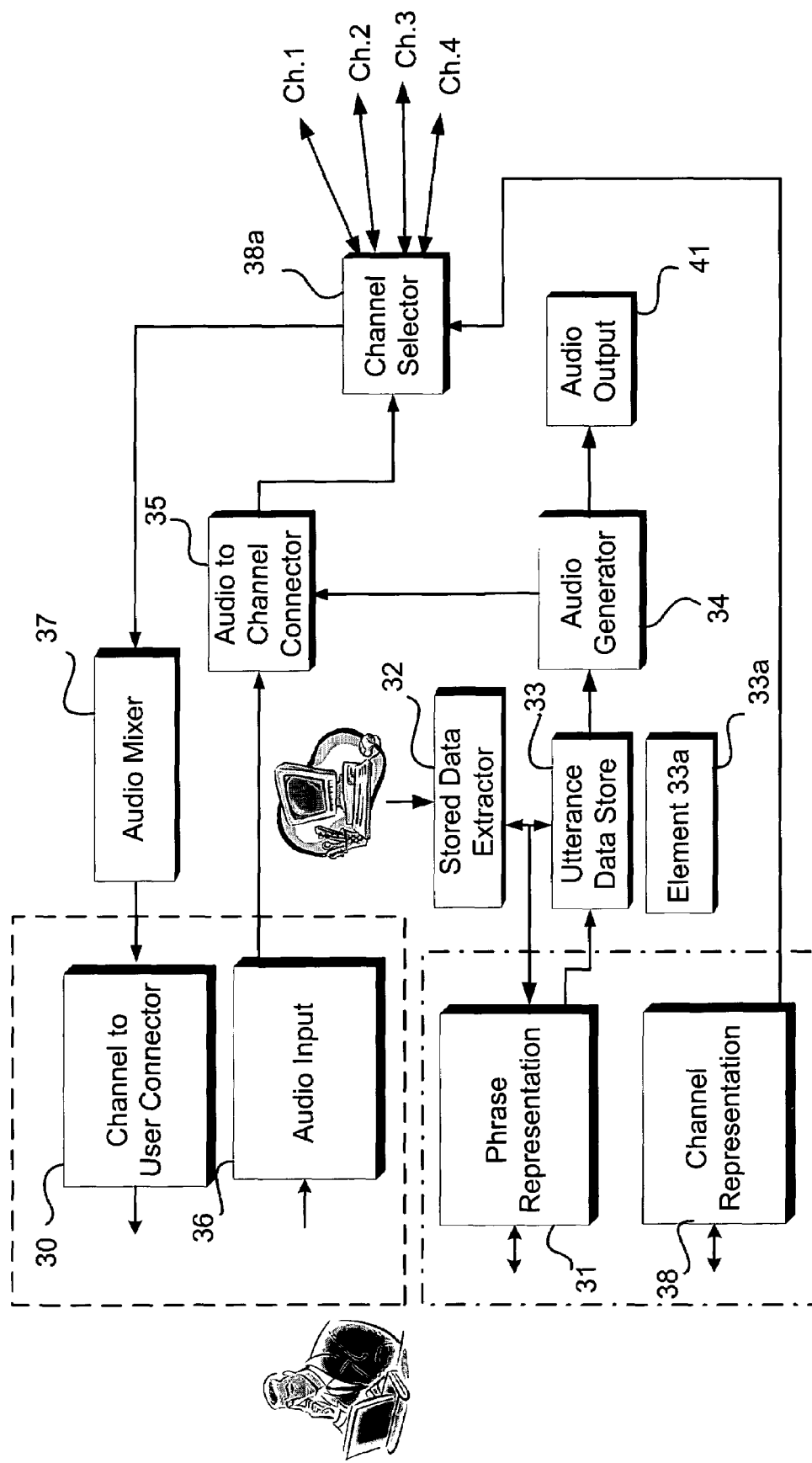
FIG. 4A illustrates a simplified block diagram for preparing Multi-Channel Quiet Call conversation structures, according to an embodiment of the present invention.
Figure 4B:
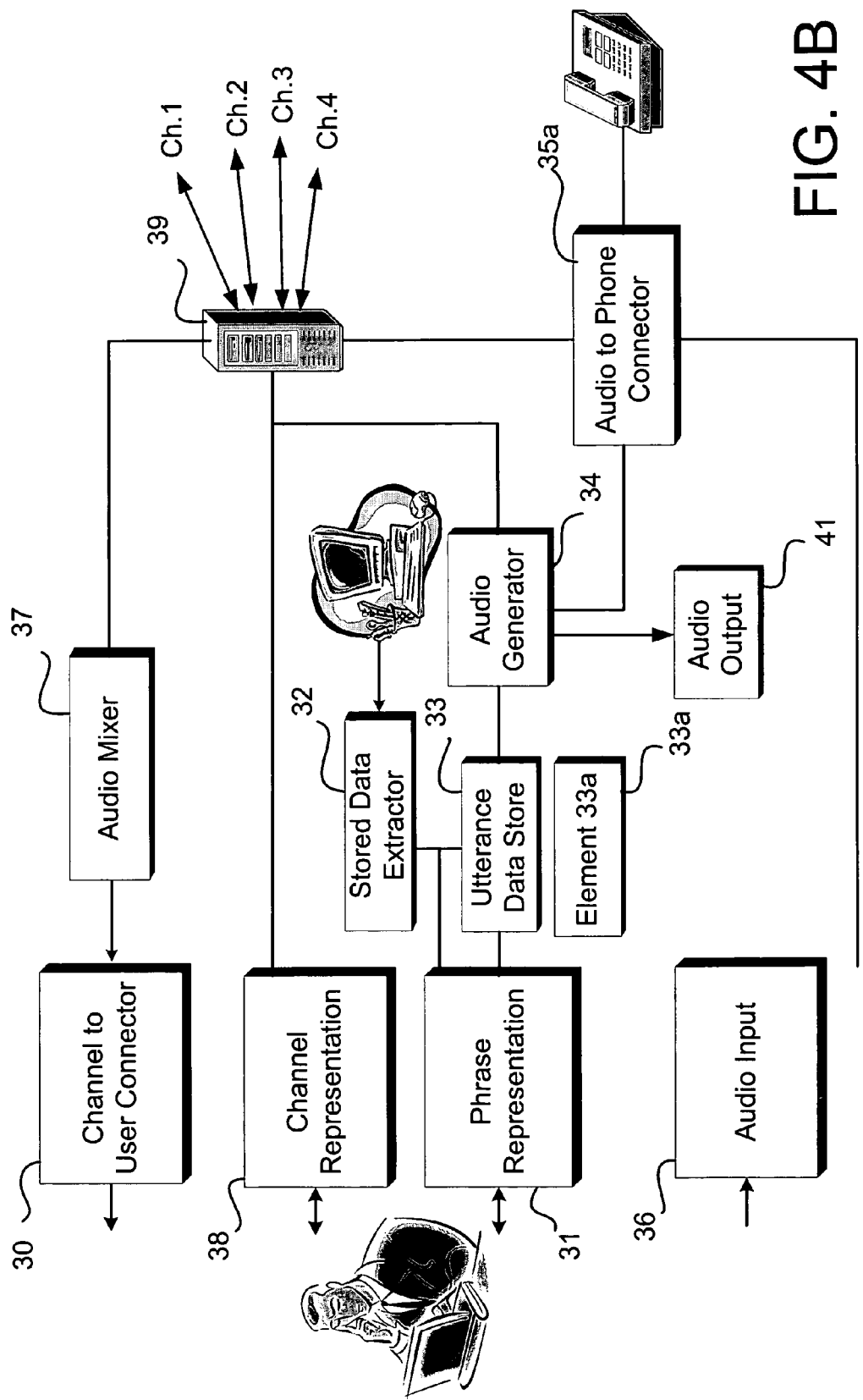
FIG. 4B illustrates a simplified block diagram for preparing Multi-Channel Quiet Call conversation structures, according to an embodiment of the present invention.

FIGS. 4A and 4B illustrate components of two different Multi-Channel Quiet Call system embodiments used for preparing a multiple-conversation structure. In this mode the user or someone acting on behalf of the user prepares for a multi-channel quiet-mode by adding, deleting, or modifying phrase structures (representations, elements and internal representations) and channel representations stored within a Multi-Channel Quiet Call system.

A user views a phrase representation 31 and makes selections about updating the utterances to be voiced over the telephone (e.g., add, modify, delete elements). The utterance data store 33 is updated appropriately. An upload/download produces the output signals which are produced through an audio output 41 to allow the user to check the stored phrase. A stored data extractor 32 converts data stored in other formats (e.g., PC calendar entries, address books) into a format suitable for inclusion into utterance data store 33.

A user may also view a channel representation 38 and make selections about updating channel selection choices, including menus, handset switches or buttons, and other types of user interface.

III. Multi-Channel Quiet Call Method

Figure 6:
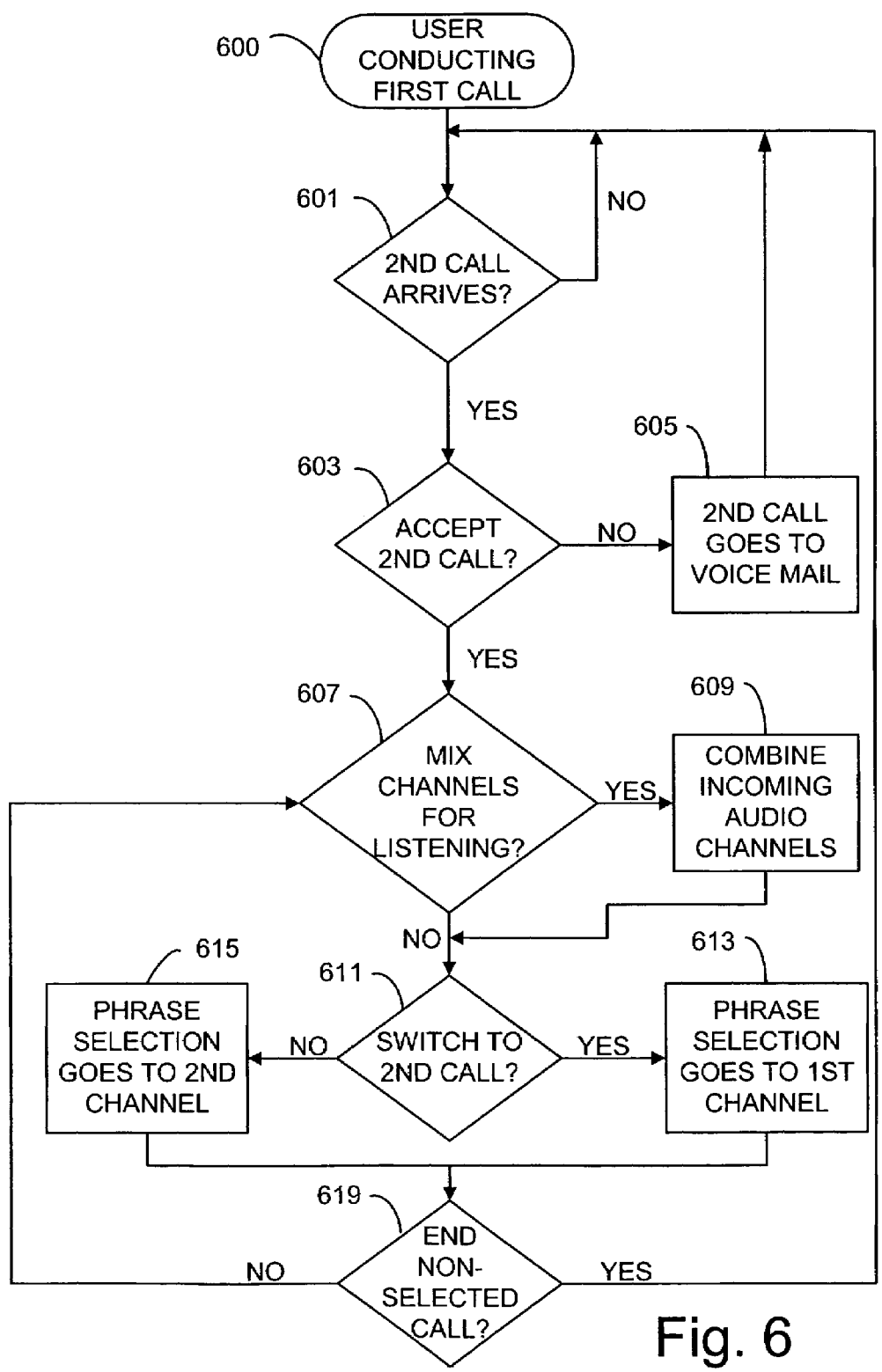
FIG. 6 is a Multi-Channel Quiet Call flowchart, according to an embodiment of the present invention.

In an embodiment, a multi-channel quiet-mode conversation is conducted according to the flowchart illustrated in FIG. 6.

As one who is skilled in the art would appreciate, FIG. 6 illustrates logic boxes for performing specific functions. In alternate embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

Figure 15A:
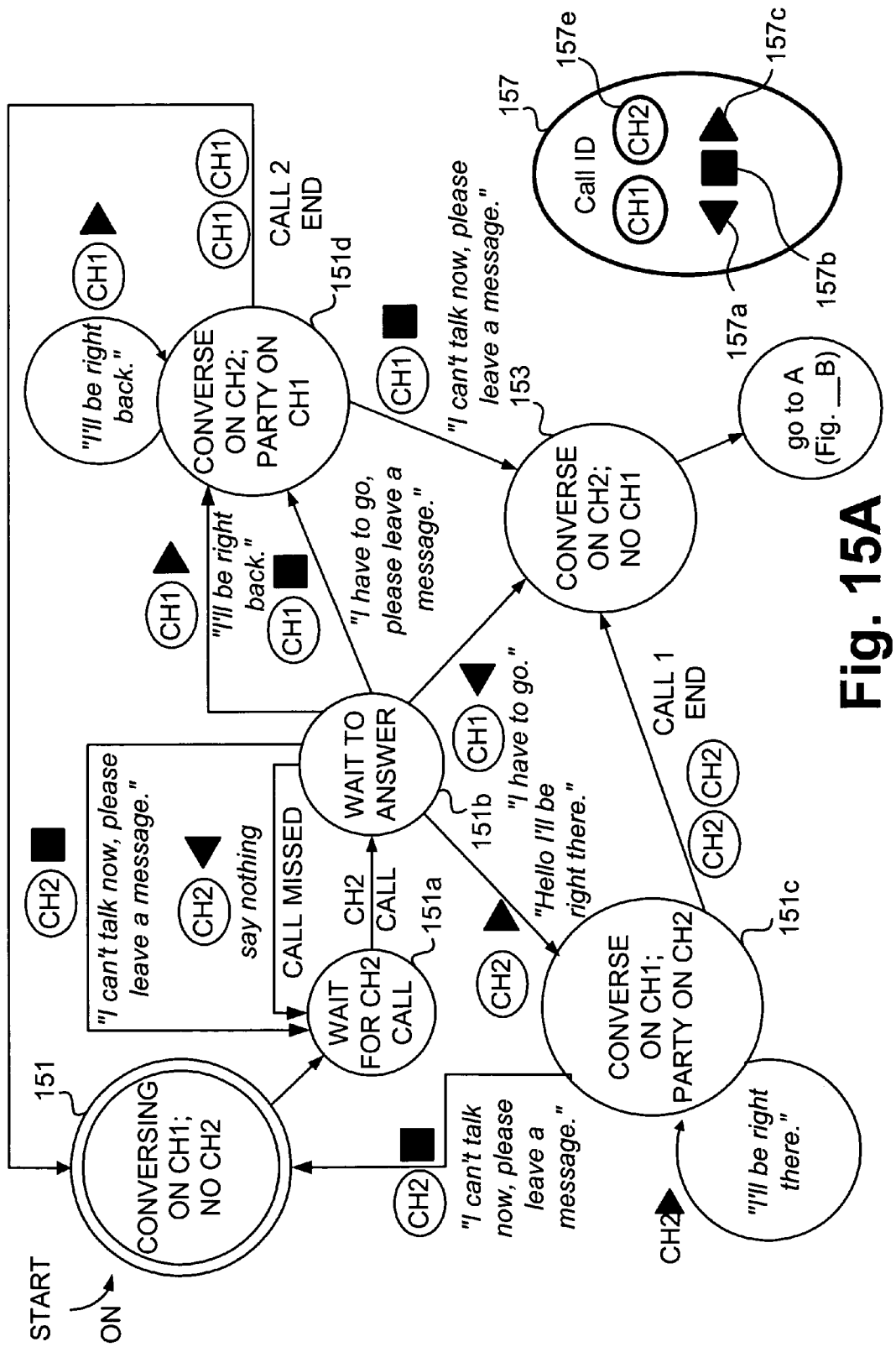
FIGS. 15A-15B illustrate a Multi-Channel Quiet Call state diagram, according to an embodiment of the present invention.
Figure 15B:
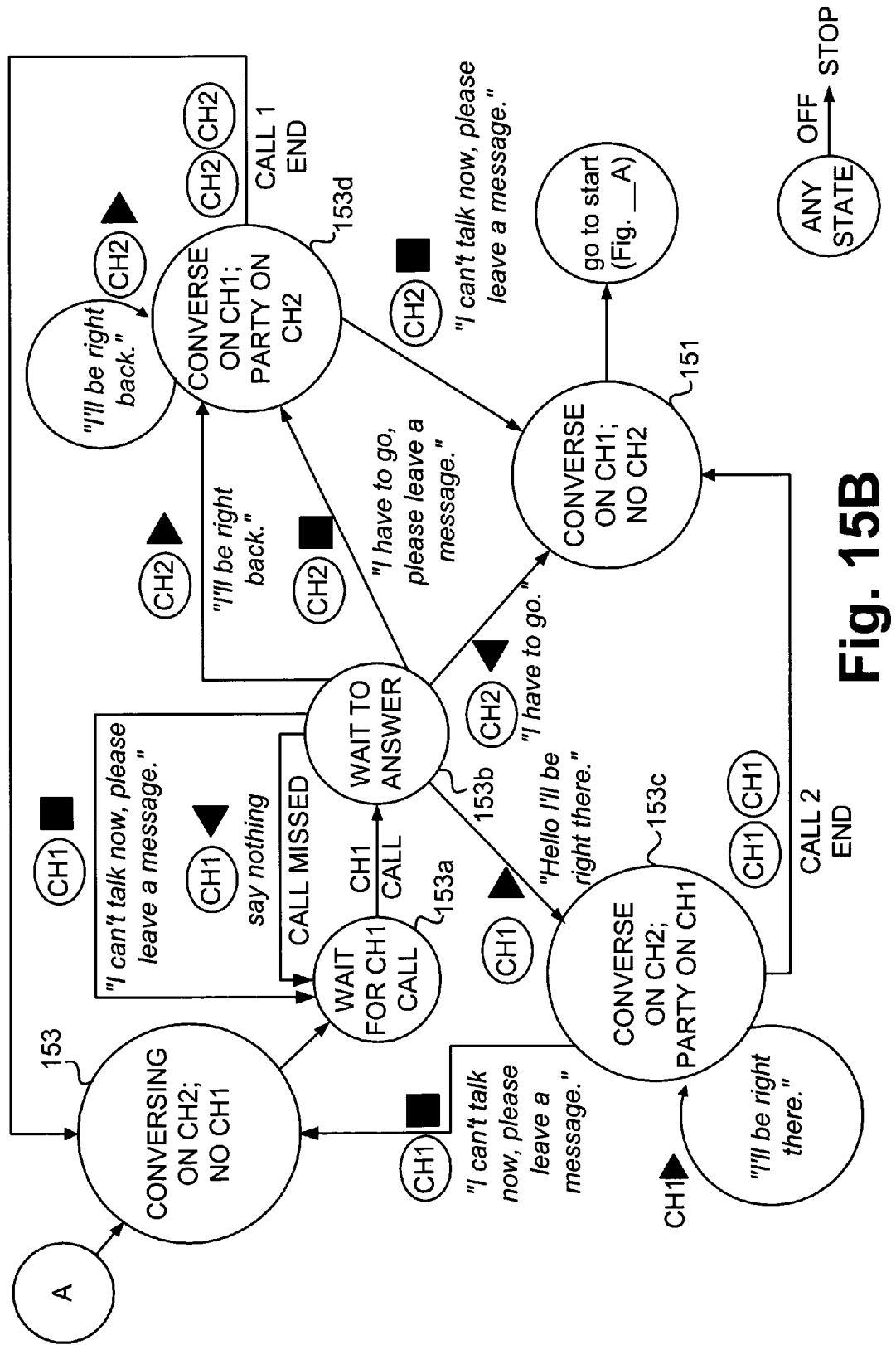

In an embodiment of the present invention, multi-channel quiet call software illustrated by FIGS. 6 and 15A-B is stored in an article of manufacture, such as a computer readable medium. For example, quiet call software may be stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

In an alternate embodiment, Multi-Channel Quiet Call software is downloaded using Hypertext Transfer Protocol ("HTTP") to obtain Java applets.

A user is conducting a first call as represented by elliptic block 600. As a user is conducting the first call the system monitors the other channels for a second call, as illustrated by logic block 601. Once a second call is identified in logic block 601 the user is notified and, as illustrated in logic block 603, a determination is made by the user as to whether to take the second call. If the user decides not to take the second call, either by notifying the system that they do not wish to take the second call or by not responding to the system's notification of the call, control is passed to logic block 605 and the second call is routed to a voice mail system and the system returns control to logic block 601. In an alternative embodiment, the second call may be disposed of in an alternative manner than a voice mail, such as disconnecting the call, delivering an audible message to the caller that the recipient is unavailable, or any other technique for terminating an incoming call.

If, however, it is decided to accept the second call, control is passed to logic block 607 and a determination is made as to whether the audio from the two channels carrying the first and second calls should be mixed. If the channels are to be mixed, control is passed to logic block 609 and the two audio channels are mixed and provided to a user. Audio channels may be mixed using hardware or software, as described above. Alternatively, as described above, a user may select to monitor the audio on one of the channels using a graphical representation of the audio. If the user does not desire to mix channels, or after mixing the channels decides to no longer mix the channels, control is passed to logic block 611.

In logic block 611 the user decides whether they will remain on the first call or switch to the second call. If the user remains on the first call a user will select, and the system will transmit, a phrase to the second call, as represented by logic block 613. Similarly, if the user selects in logic block 611 to switch calls, the user will select, and the system will transmit, a phrase to the first call, as represented by logic block 615.

Subsequent to transmission of the selected phrase, according to either logic block 613 or 615, a determination is made in logic block 619 as to whether the non-selected call is terminated, either by the user or the other party. If the non-selected call is terminated, control is returned to logic block 601 and the system returns to monitoring for an incoming call. If the non-selected call has not been terminated, control is returned to logic block 607 and the process continues.

As the process described with respect to FIG. 6 proceeds, a user can relay information to another caller without interrupting their existing conversation. Exceptional situations in the Multi-Channel Quiet Call method may occur asynchronously as follows: (1) whenever the user wants live audio to be incorporated into a particular channel, the user can switch between channels or relay live audio into all channels; (2) the user is able to override a currently playing phrase element by making a new selection from a phrase representation 31; (3) the user may terminate communication on one channel at any time; and (4) the user may switch channels at any time.

FIGS. 15A and 15B illustrate a state transition diagram for a Multi-Channel Quiet Call embodiment of the present invention. In particular, FIGS. 15A and 15B illustrate a state transition diagram in which a mechanical device 157 having left button 157a, center button 157b, right button 157c, Channel 1 button 157d and Channel 2 button 157e, are used to transition into the various states. Buttons 157a-c are examples of phrase representations for phrase elements. The buttons may represent different phrase representations at different states. Buttons 157d-e are examples of channel representations for incoming channels.

In the illustrated embodiment, ten states are present: a conversing on channel 1, no party on channel 2 state 151; a wait for channel 2 call state 151a; a wait to answer state 151b; a converse on channel 1, party on channel 2 state 151c; a converse on channel 2, party on channel 1 state 151d; a converse on channel 2 no party on channel 1 state 153; a wait for channel 1 call state 153a; a wait to answer state 153b; a converse on channel 2, party on channel 1 state 153c; and a converse on channel 1, party on channel 2 state 153d. A user can transition to the various states by pressing buttons 157a-e. As the various states are transitioned, audible messages may be generated on a selected channel while a user converses on another channel.

For example, a transition from the wait for channel 2 call state 151a to the wait-to-answer state 151b is accomplished on the occurrence of an incoming second call event. A user then has six options: the user may ignore the call on channel 2 by pressing buttons 157e and 157a; the user may generate the utterance: "I cannot talk now, please leave a message" to the caller on channel 2 by pressing buttons 157e and 157b; the user may generate the utterance "Hello, I will be right there" to the caller on channel 2 by pressing the buttons 157e and 157c; the user may switch to conversing on channel 2 and generate the utterance "I have to go" to the caller on channel 1 by pressing the buttons 157d and 157a; the user may switch to conversing on channel 2 and generate the utterance "I will be right back" by pressing the buttons 157d and 157c; or the user may switch to conversing on channel 2 and generate the utterance "I have to go, please leave a message" to the caller on channel 1 by pressing the buttons 157d and 157b.

In an alternative embodiment, a user may only need to select a phrase button 157a-c and the associated phrase will automatically be sent to the call they are not conversing on. In such an embodiment, the user may change conversations by selecting a different channel using channel buttons 157d-e.

As can be seen by FIGS. 15A and 15B, embodiments of the present invention allow a user to send information to another caller without interrupting an existing conversation.

IV. Multi-Channel Quiet Call Embodiments

In a multi-channel quiet mode, all sides of the conversation use an electronic device, such as a mobile telephone. The devices may be wired or wireless devices. The person in the multi-channel situation (i.e. having the ability to communicate concurrently over multiple channels) would have a special interface for responding to one or all of the calls. Five different embodiments are described below: (1) a PC, (2) a PDA, (3) a scanner and paper interface, (4) a telephone accessory device having a physical button interface, and (5) a telecommunications infrastructure having Multi-Channel Quiet Call capability. Other embodiments may include using an intercom, CB radio, two-way radio, short-wave radio, or other radio transmitter such as FM or Bluetooth, etc.

A. PC Embodiment

A PC system embodiment for conducting Multi-Channel Quiet Calls uses a personal computer as a "controller."

In a PC embodiment, a GUI template having a channel representation and a phrase representation is stored in the PC. A user, such as individual 17, points and clicks, and the computer "talks" silently into selected channels through an audio connection while the user simultaneously converses on another channel.

This is accomplished by storing representations of each incoming channel and the pre-recorded phrases of interest in a format suitable for display and selection by the user. FIG. 7 shows a GUI representation that contains channel representations for selecting desired channels to transmit a phrase over and phrase representations having internal representations expressed in the user's own voice. For example, incoming channels 1 and 2 are represented by icons 72 and 73, respectively, and phrase representations, such as a collection of Hello 70 icons, are represented as icons 70a-d. A user may pre-record an intro 70a such as: "This is Amy. I am on another call, I will be with you shortly. Please hold." Other types of icons and associated text may also be used. For example, information 71 icons may include icons 71a-d. "Good-bye" icon 74 includes icons 74a-c. Additional icons may be added to represent additional incoming channels and/or additional phrases.

FIG. 19 shows an alternative GUI representation that contains channel representations and phrase representations. For example, the GUI representation 1900 displays the different channels 1910, 1920, 1930, 1940, and 1950 available to the user. For each channel 1910, 1920, 1930, 1940, 1950 information such as the incoming caller's telephone number 1912, and 1922; the currently selected phrase for each channel 1914, 1924 and a phrase selection menu 1916, 1926, 1936, 1946, and 1956 are displayed to a user. Some phrases, such as active phrase 1914 may be modified by a user before they are audibly transmitted to the desired party. For example a user can select an amount of time to be audibly generated with said phrase by selecting clock icon 1917. Other phrases may be "fill in the blank" style forms resulting in synthesized voice, multiple choice forms, "mix-and-match" style phrase groupings, etc.

Additionally, a user may select a new action phrase by selecting from the phrase selection menu 1916.

Other information which may be displayed for each channel 1910, 1920, 1930, and 1940 to a user include the type of channel (e.g.: call, conference call, radio frequency, call sign, land line call, cellular call); the state of the channel (e.g.: activity on-hold, standby, name of the caller and other metadata about the channel, etc.); whether audio is being mixed; etc.

In an embodiment, Microsoft PowerPoint is used to form channel representations, phrase representations and phrase elements: (1) a graphical structure, as illustrated by FIG. 7, having channel selectors 72 and 73 and nodes which contain audio clips (WAV format); (2) a text-to-speech generator (derived from an Active X component containing Microsoft Agent speech functionality); and (3) a GUI as illustrated in FIG. 19. Microsoft Agent software includes text-to-speech functionality. Using standard Microsoft interface definitions (e.g. Active X component), Microsoft Agent text-to-speech functionality is embedded into a PowerPoint slide and is used as a Multi-Channel Quiet Call GUI providing text-to-speech functionality for Multi-Channel Quiet calls.

Channel and phrase templates may be shared (e.g., as Web pages, shared files, e-mail messages) between a group of frequent user's (e.g., uploaded/downloaded). Individuals can pick and choose the type of phrase in which they wish to engage and each works through a shared template using the Multi-Channel Quiet Call interfaces.

FIG. 2 illustrates a Multi-Channel Quiet Call PC system embodiment. System 20 includes a PC 21 having a sound card which is connected to the input jack of a mobile telephone input. The user has an earpiece which allows a user to hear audio from a selected channel, or the audio from multiple channels may be mixed.

In an embodiment, personal computer 21 includes channel representation 38, phrase representation 31, utterance data store 33, audio generator 34, upload/download 40 and audio output 41 as described above. In an embodiment of the present invention, channel representation 38 and phrase representation 31 are power point slide shows. Likewise, in an embodiment of the present invention, utterance data store 33 is a power point representation. Similarly, audio generator 34 and upload/download 40 is a PC sound card and power point file transfer software, respectively. Channel selecting may be done using the facilities provided by an existing telecommunication infrastructure, such as in-band signaling (e.g.: hook switch command), or out-of-band signaling.

Audio output 41 is switchable between the PC speaker jack and the PC speaker. The PC speaker is disengaged while the speaker jack is in use. The PC speaker jack is coupled to an audio-to-channel connector 22. The generated phrase may be made audible in the user locale (e.g., as part of the preparation process) by removing the plug from the PC speaker jack. In an embodiment of the present invention, audio-to-channel connector 22 is an impedance matching circuit as illustrated in FIG. 5. An impedance matching circuit permits the PC audio signals to be directed into the mobile telephone voice input. In an embodiment, $R_1$=10K ohms, $R_2$=460 ohms, and $C_1$=0.1 microfarads. The audio-to-channel connector 22 is then coupled to a mobile telephone 23 audio input.

In an embodiment of the present invention, the mobile telephone 23 is a QualComm pdQ Smartphone with hands-free headset having an earpiece and microphone in which we include a direct connection from the PC to the audio-to-channel connector 22.

B. PDA Embodiment

In a PDA embodiment, a GUI channel representation, and a GUI phrase representation are stored on PDA 80 and displayed on a PDA screen. The user taps channel and phrase buttons and the PDA "talks" silently into the selected channel or channels through an audio connection while the user simultaneously converses on another channel.

Figure 8:
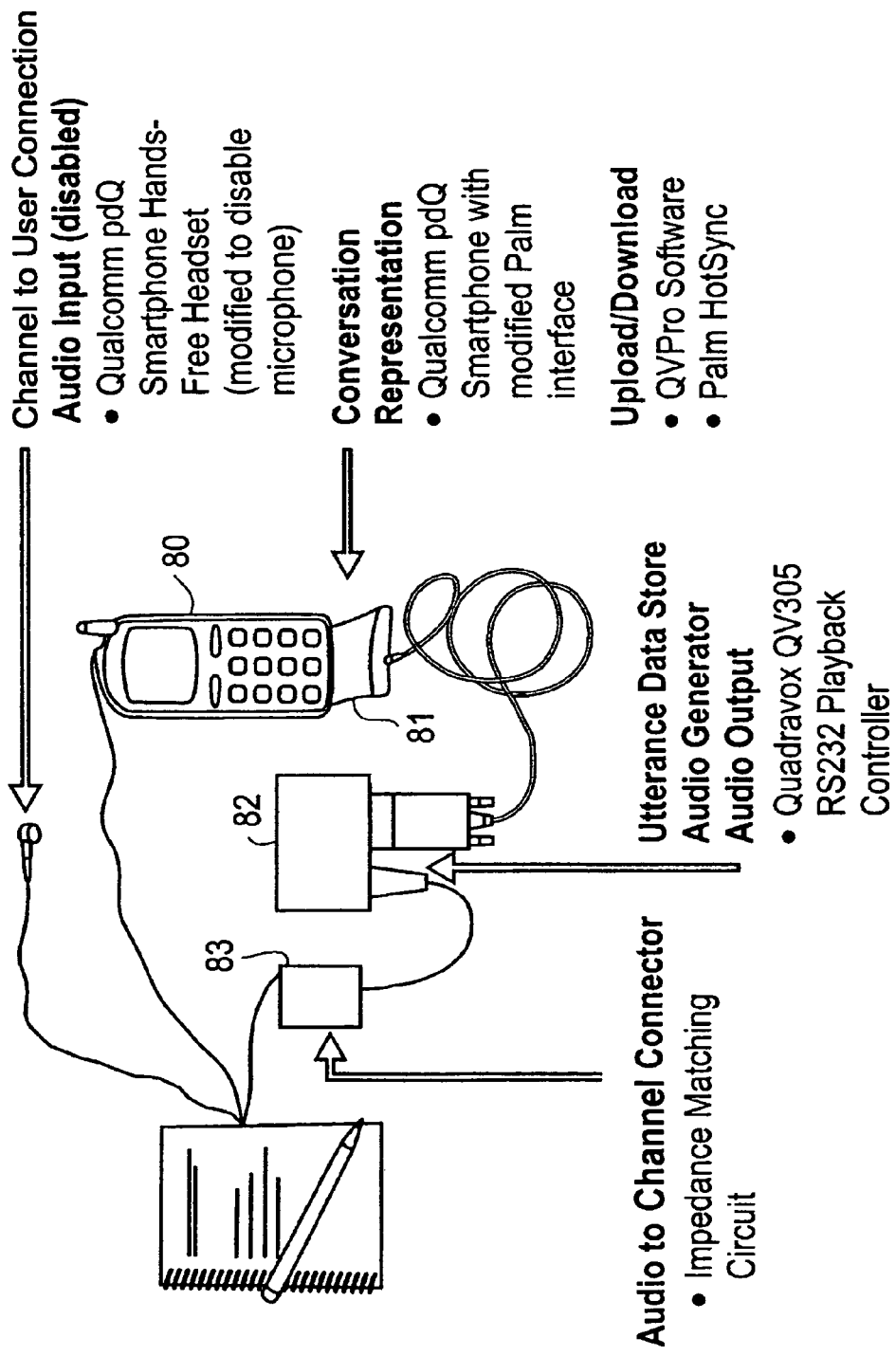
FIG. 8 illustrates a Multi-Channel Quiet Call personal digital assistant ("PDA"), according to an embodiment of the present invention.

A PDA embodiment is illustrated in FIG. 8 and includes PDA 80 and PDA interface 81. PDA interface 81 is coupled to a controller 82. Audio output of controller 82 is then coupled to audio-to-channel connector 83. Examples of specific structures of the various components of the PDA embodiment are described below.

Figure 9:
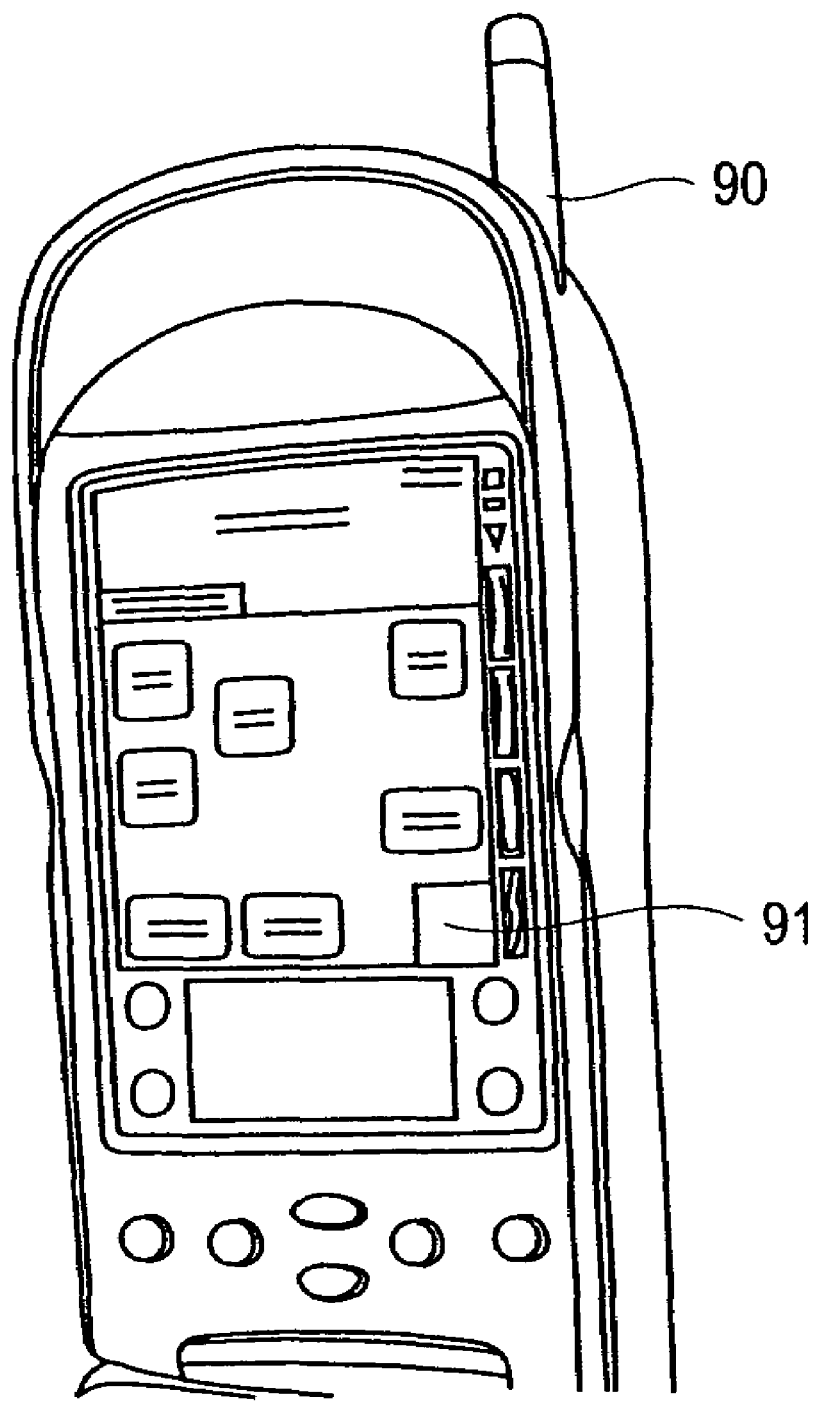
FIG. 9 illustrates a mobile telephone displaying a Multi-Channel Quiet Call GUI, according to an embodiment of the present invention.

FIGS. 8 and 9 illustrate a PDA embodiment (e.g., Qualcomm pdQ Smartphone having hands-free headset). PDA 80 uses a GUI such as the ones illustrated in FIGS. 7 and 19 for selecting channels and phrases.

In an embodiment, a controller 82 (e.g., Quadravox QV305) stores audio clips that may be accessed randomly or sequentially. In an embodiment, controller 82 is a Quadravox QV305 RS232 playback controller. In alternate embodiments, controller 82 communicates by a wired/wireless Universal Serial Bus ("USB"), IrDA connection, parallel port, Ethernet, local area network, fiber wireless device connection (e.g. Bluetooth), in combination or singly. A PDA embodiment also includes upload/download 40 such as QVPro software supplied by Quadravox, Inc.

Controller 82 is connected to a telephone input through an impedance matching circuit as illustrated in FIG. 5 that permits the PDA audio signals to be directed into the PDA voice input. In an embodiment $R_1$=10K ohms, $R_2$=460 ohms, and $C_1$=0.1 microfarads. PDA 80 is coupled to controller 82 through an RS232 serial port. The audio clip number indicated by selection on the PDA interface is communicated to controller 82 through the PDA serial port.

In an embodiment, channel structure and phrase structure consist of a spatially grouped collection of PDA software buttons 91 as shown in FIG. 9. A representative sample of channel and phrase representations includes: channel 1; channel 2; greetings (e.g., "I'll be right there"); and information flow control (e.g., "I'll be right back"). Channel selection may be done using an application programming interface of the PDA to control and execute the appropriate command sequence to select the desired channels. If the PDA does not include a programmable interface, the commands may be generated in the audio stream.

C. Paper User Interface Embodiment

Figure 10:
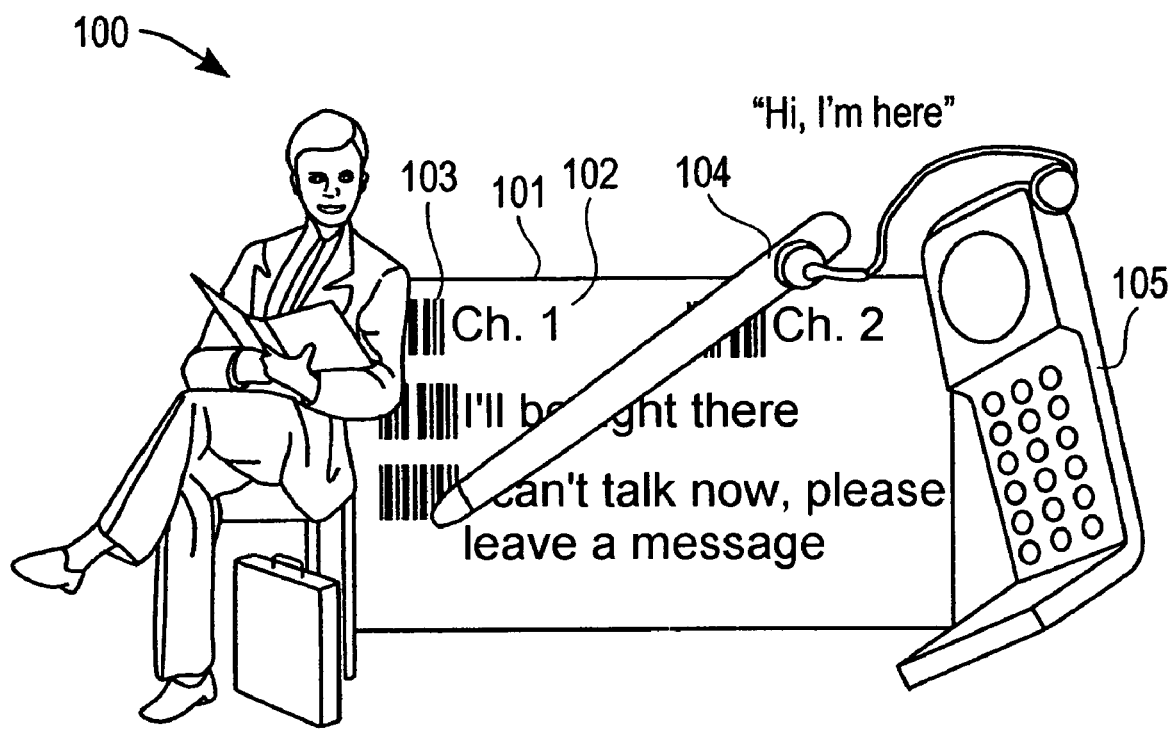
FIGS. 10-11 illustrate a Multi-Channel Quiet Call processing device and scanner, according to an embodiment of the present invention.
Figure 11:
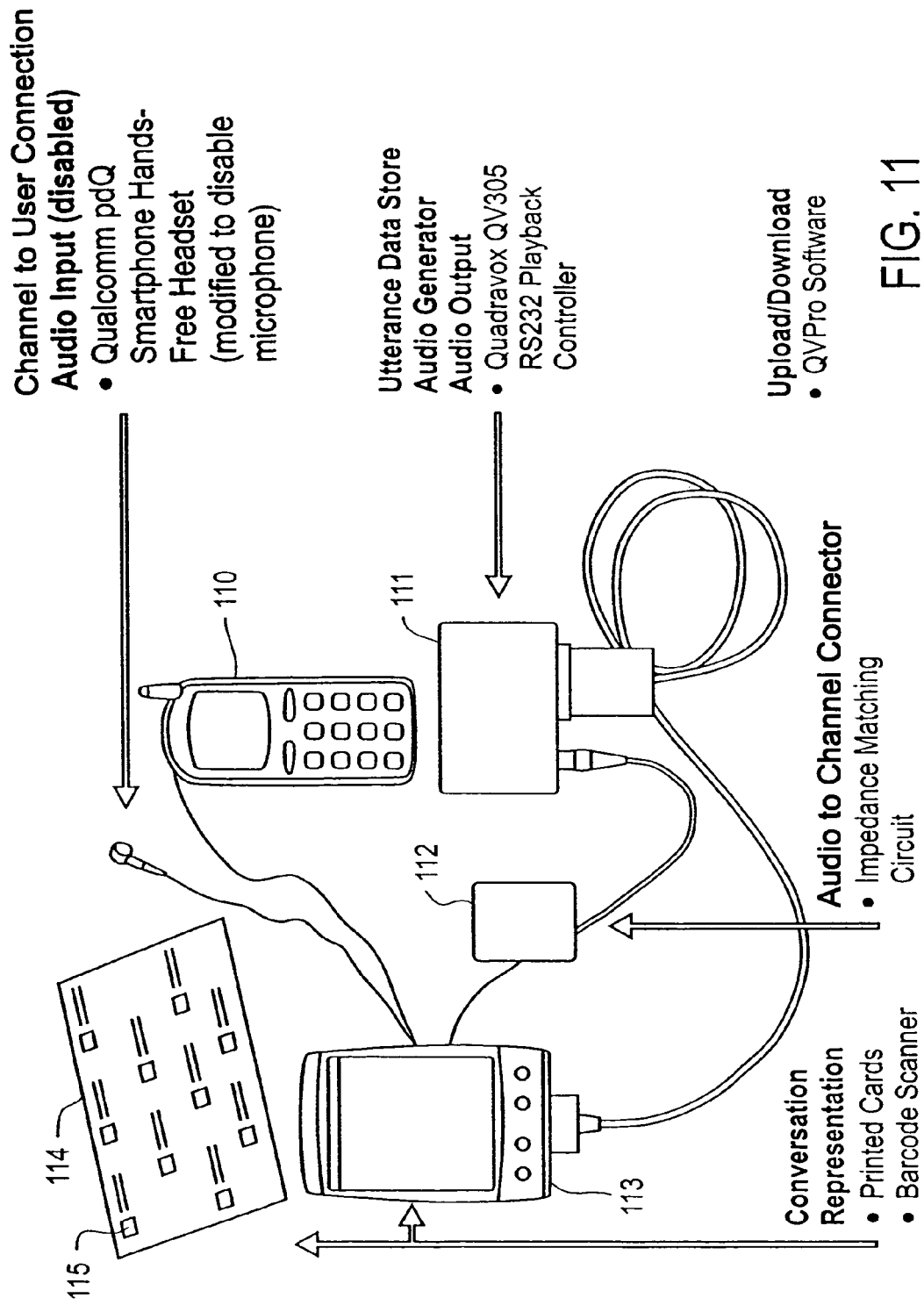
Figure 12:
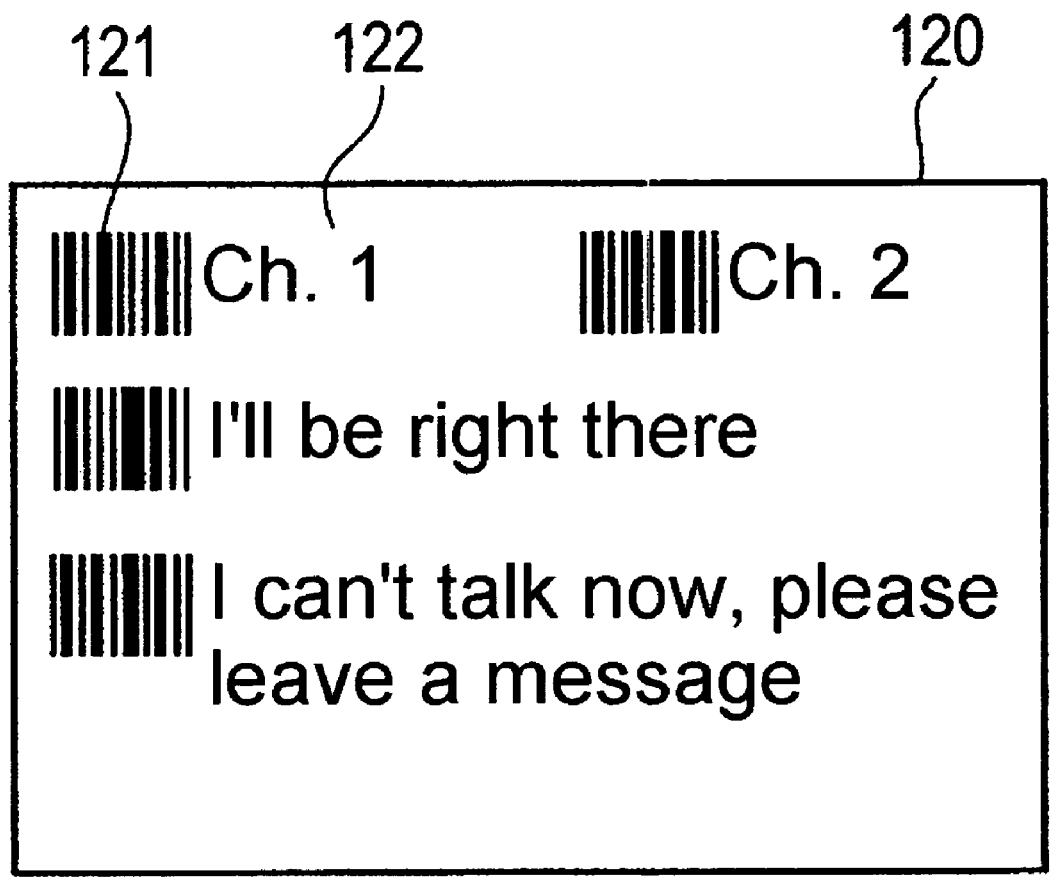
FIG. 12 illustrates a paper having bar codes as conversation representations used in a Multi-Channel Quiet Call processing device and scanner, according to an embodiment of the present invention.

In a paper user interface embodiment, channel representation and phrase representation are printed on paper (e.g., notebook or cards) as illustrated in FIGS. 10, 11 and 12. A user scans (e.g., barcode or glyph reader) the channel and phrase elements associated with the channel and phrase representations (e.g. codes) and the computer "talks" silently into the selected channel through an audio connection.

FIG. 11 illustrates a paper user interface Multi-Channel Quiet Call embodiment. The paper user interface embodiment includes PDA 110 and controller 111. In an embodiment, controller 111 is used as an utterance data store 33, audio generator 34 and audio output 41. In an embodiment, controller 111 is a Quadravox QV305 RS232 playback controller. A paper user interface embodiment also includes upload/download 40 such as QVPro software supplied by Quadravox, Inc. Controller 111 is coupled to audio-to-phone connector 112. In an embodiment, audio-to-phone connector 112 is an impedance matching circuit as illustrated by FIG. 5. Scanner 113 is also coupled to controller 111. Scanner 113 is used to read paper interface 114, including codes 115.

FIG. 12 also illustrates another embodiment of a paper interface. Paper interface 120 includes codes 121 (or channel and phrase elements) for channel representations such as channel 1, and phrase representations such as "I'll be right there."

In FIG. 11, a scanner 113 such (such as a Symbol SPT-1500 barcode scanner) is used to read channel and phrase elements. In an embodiment, a scanner 113 is coupled to controller 111 through an RS232 port. Each code indicates either a channel or an audio clip (WAV format) associated with a phrase representation.

A controller 111 (e.g., Quadravox QV305 RS232 Playback Controller) stores audio clips that may be accessed randomly or sequentially. Controller 111 is connected to a telephone input through an impedance matching circuit 112 which permits the audio signals to be directed into the telephones voice channel. In an embodiment, $R_1$=10K ohms, $R_2$=460 ohms, and $C_1$=0.1 microfarads. The audio clip number indicated by selection on the PDA interface is communicated to controller 111 through a PDA RS232 serial port. The generated conversations are audible both in the hands-free earpiece and through the telephone line, but not in the general locale of the user. Channel selecting may be done using the facilities provided by an existing telecommunication infrastructure, such as in-band signaling (e.g.: hook switch command), or out-of-band signaling.

D. Telephone Accessory Embodiment

In a telephone accessory embodiment, physical interfaces such as labeled buttons are channel and phrase representations. A device is attached to a telephone as a telephone accessory or may be incorporated into the design of a telephone mechanism itself. A user pushes a channel and phrase button and the computer "talks" silently into the selected channel through an audio connection while the user continues to converse on another channel.

Figure 13:
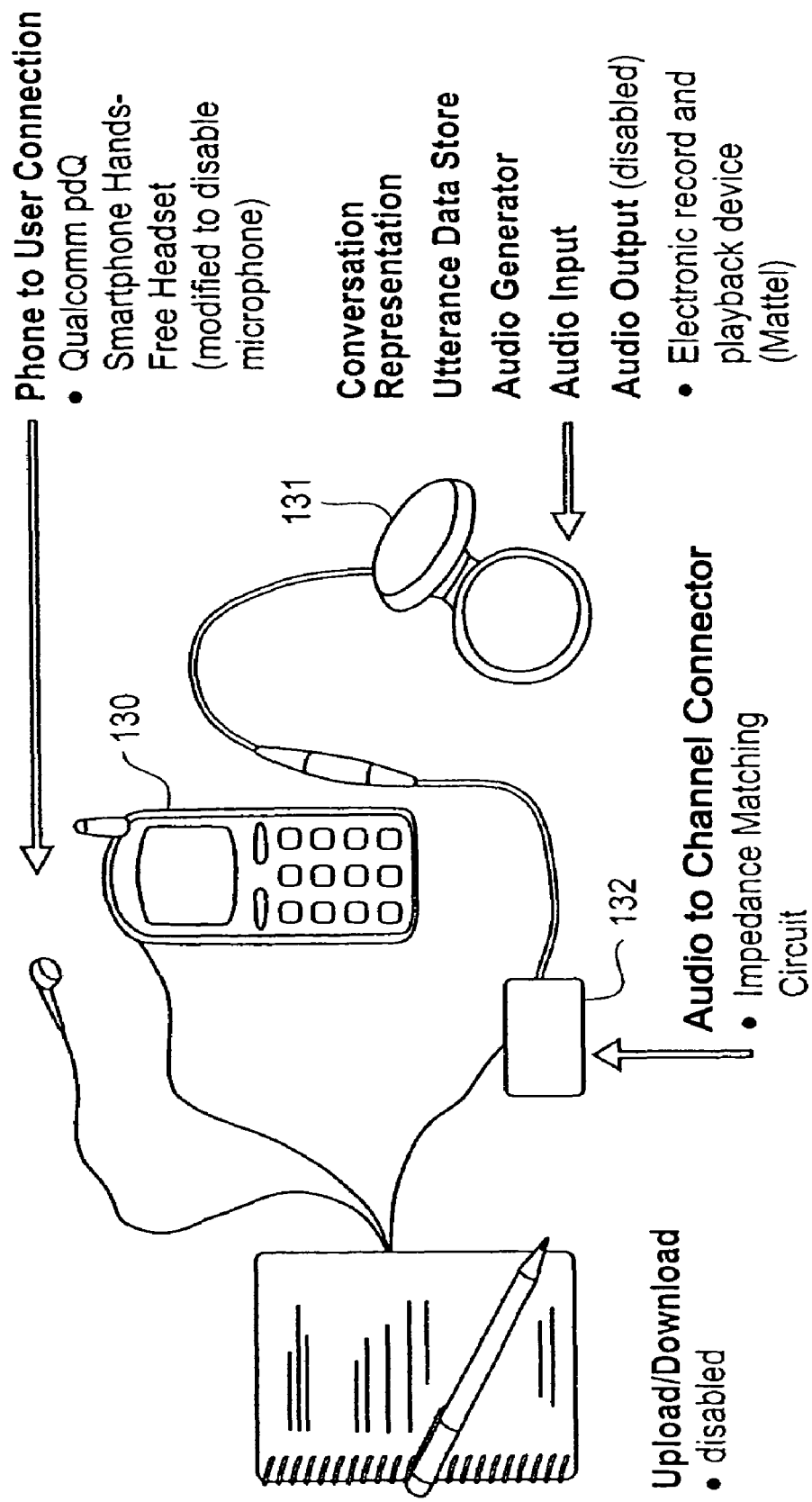
FIG. 13 illustrates a Multi-Channel Quiet Call telephone accessory device, according to an embodiment of the present invention.

FIG. 13 illustrates an example of a telephone accessory embodiment of the present invention. The telephone accessory embodiment includes mobile telephone 130 coupled to device 131 which is coupled to audio-to-phone connector 132. Device 131 is a physical interface having labeled or marked buttons as respective channel and phrase representations.

In a telephone accessory embodiment, the mobile telephone 130 is a Qualcomm PDQ Smartphone having a hands-free headset. In a telephone accessory embodiment, device 131 is an electronic record and playback device. In an embodiment, audio-to-phone connector 132 is an impedance matching circuit as illustrated by FIG. 5.

In an embodiment, one or more single-channel audio record and playback chips (e.g., Radio shack™ Recording Keychain) stores the audio that may be accessed through the labeled control buttons. The chips are connected to the telephone input through audio-to-channel connector 132 which permits the audio signals to be directed into a selected channel through the telephone. In an embodiment, audio-to-channel connector 132 is an impedance matching circuit as illustrated in FIG. 5 having $R_1$=10K ohms, $R_2$=460 ohms, and $C_1$=0.1 microfarads. The generated phrases are audible through the selected channel or channels, but not in the non-selected channels.

A one-chip version can hold a single greeting or multiple greetings that may be used to defer an incoming call until the user completes their current conversation. Other chips may be added for additional phrases.

E. Telecommunications Infrastructure Embodiment

Figure 14:
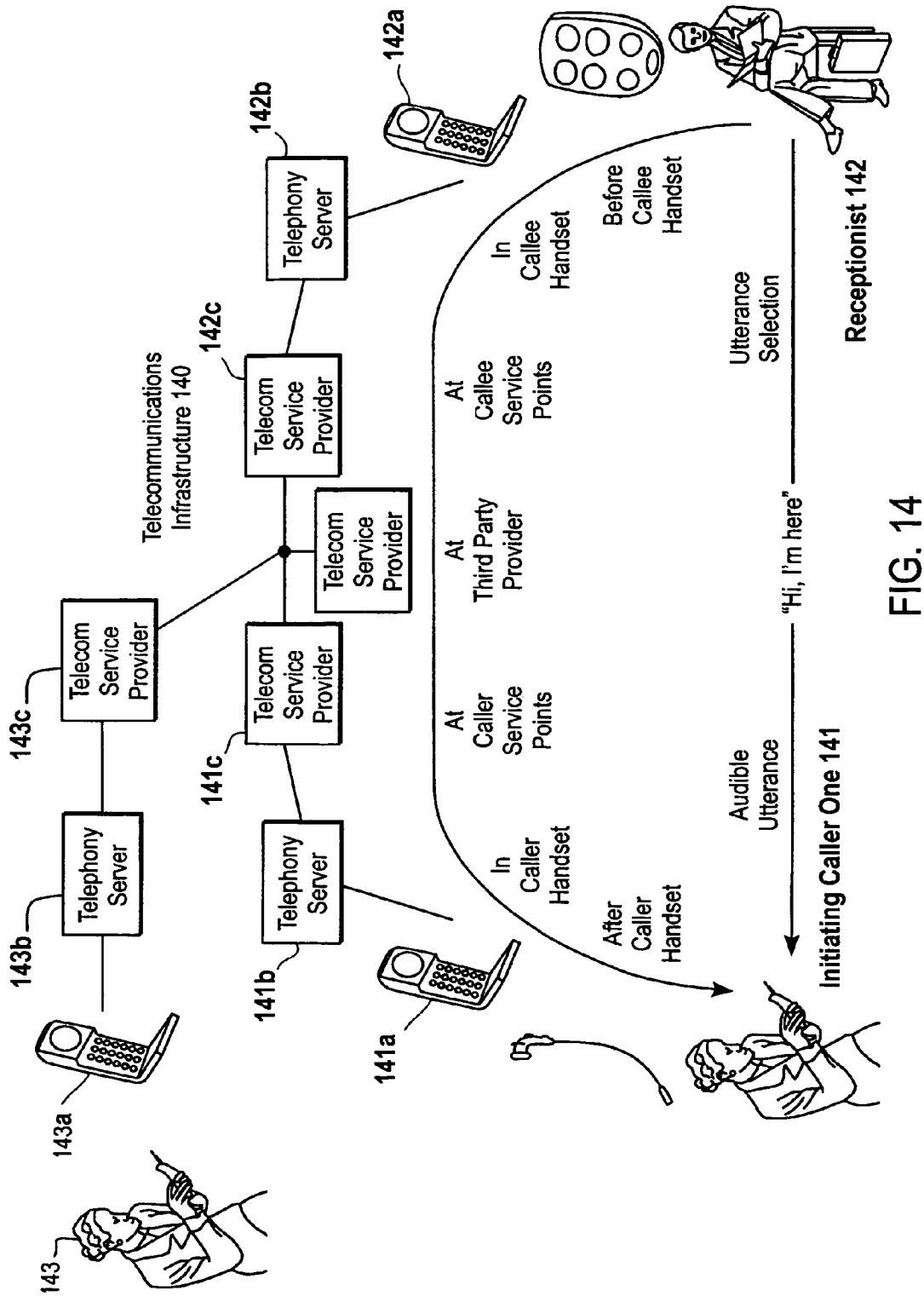
FIG. 14 illustrates a Multi-Channel Quiet Call telecommunications infrastructure, according to an embodiment of the present invention.

As described above, a multi-channel call is conducted where at least one of the users is conversing over multiple channels. The non-verbal interface is used to select a channel, select an utterance, and play the utterance (recorded or synthetic) over the selected channel. There are a number of places where audio production may be introduced in the channel's voice path as illustrated by FIG. 14. In an embodiment, receiving caller 142 is a receptionist who needs to manage several incoming calls.

FIG. 14 illustrates a telecommunications infrastructure 140 having Multi-Channel Quiet Call technology. Telecommunications infrastructure 140 includes a telephone 141a used by initiating caller one 141. Telephone 141a accesses telecom service provider 141c. Telephone 141a optionally accesses telephony server 141b that is coupled to telecom service provider 141c. In an embodiment, telecom service provider 141c accesses telecom service provider 142c, which controls telephony server 142b. Telephony server 142b then provides services to the receptionist telephone 142a.

Also included in telecommunications infrastructure 140 is a second telephone 143a used by a second initiating caller two 143. Telephone 143a accesses telecom service provider 143c. Telephone 143a optionally accesses telephony server 143b that is coupled to telecom service provider 143c. In an embodiment, telecom service provider 143c accesses telecom service provider 142c, which controls telephony server 142b. Telephony server 142b then provides services to the receptionist telephone 142a.

Software and/or mechanical devices anywhere along the telecommunications infrastructure 140 maybe used to implement embodiments of the Multi-Channel Quiet Call technology. For example, Multi-Channel Quiet Call software may be implemented at telecom service provider 142c. The user then may select channels and initiate utterances by selecting buttons on mobile telephone 142a.

i. In-Band and Out-of-Band Utterance Selection

There are at least two Multi-Channel Quiet Call telecommunication infrastructure embodiments: (1) control signals for channel and utterance selections made by a caller are mixed with the voice audio (i.e., in-band communication such as touch tones) or (2) control signals use a communication channel different from the voice signal (i.e., out-of-band). In both embodiments a server application capable of generating Multi-Channel Quiet Call utterances has access to a telecommunications infrastructure and can manipulate the content of the voice path of a call (e.g., a telephone server of a service provider) as illustrated in FIG. 14.

a. In-Band Selection for Adding Channel Activation and Voice Audio

Figure 16A:
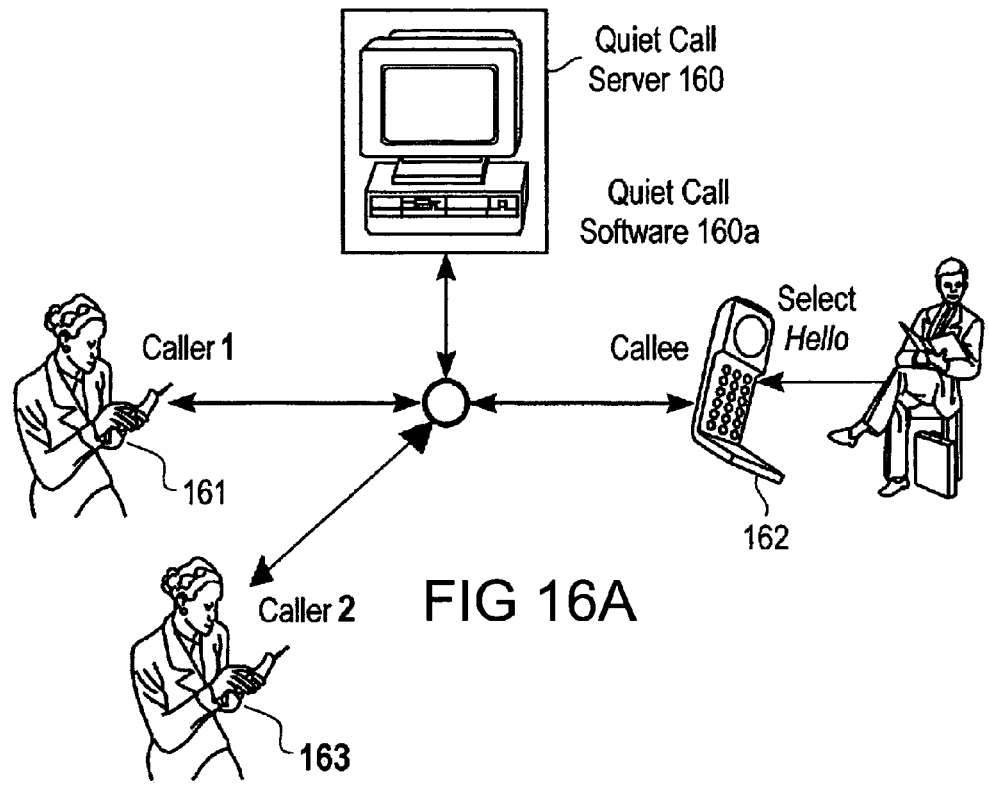
FIGS. 16A-16B illustrate a Multi-Channel Quiet Call in-band telecommunication infrastructure, according to an embodiment of the present invention.
Figure 16B:
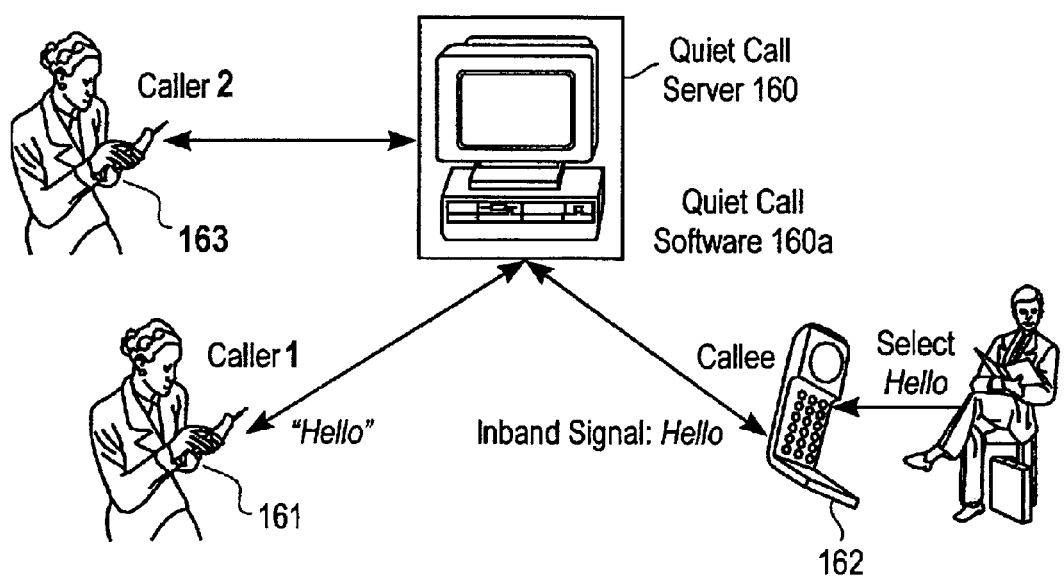

FIGS. 16*a-b* illustrate in-band telecommunication infrastructure embodiments and a Multi-Channel Quiet Call server.

If a telephone supports a text display, a set of channels and possible utterances is displayed on a telephone. The text is either configured with the telephone, obtained previously from a telecommunication provider (e.g., downloaded in a previous voice or data call), obtained, or customized during a current call. Communication could be through telephone information fields such as caller ID or through in-band signaling such as Dual-Tone Multi Frequency ("DTMF"), for touch tone signaling, fax tones, or a custom signaling technique that is in some way more audibly appealing (e.g., rhythmic or musical sequences).

If a telephone supports dedicated selection keys, these may be used to navigate the channel and phrase element selections. When one of the options is selected, a message with the encoded selection including the selected channel or channels is sent back to the server with in-band signaling. The selection message is used to activate the selected channels, access and transmit the corresponding phrase element through the selected channel.

If the telephone does not support selection keys, the standard numeric pad maybe used for the selection (e.g., *, 1, 2, etc.). The associated DTMF signal might be suppressed from the other party by carrier or provider specific mechanisms. Alternatively, the telephone could support alternative tone generation that is not so audibly disturbing (e.g., other frequency or rhythmic patterns).

In an embodiment, a receiving caller's telephone 162 would have the Multi-Channel Quiet Call technology to access a Multi-Channel Quiet Call server 160 and Multi-Channel Quiet Call Systems 160*a* as illustrated in FIG. 16*b*.

In an alternative embodiment, a third party provider is brought into the call (most likely by the receiving caller) as illustrated in FIG. 16*a*. In this case, a direct line would be kept active between the receiving caller and one of the callee's, and a conference call would be established to accept an additional incoming caller and control phrase element selection signals (most likely as DTMF or other audible pattern), translate the signals into corresponding audible utterances and transmit the audible utterance to the incoming caller.

The following describes various in-band telecommunication infrastructure embodiments. First, a proxy answer at a Multi-Channel Quiet Call server embodiment may be used. Calls to a telephone are actually first placed through a service number. This may be made transparent to initiating callers 161 and 163 by providing the service number as the point of contact. A Multi-Channel Quiet Call server 160 (e.g., telephony program or service provider function) answers the incoming calls from callers 161 and 163 and dials a receiving caller's telephone 162. Callee answers telephone 162 and completes a connection to the first initiating caller 161. The receiving telephone 162, then quickly makes a connection to Multi-Channel Quiet Call server 160 (e.g., through a conference call or as a relay with the server application acting as an intermediary, as shown in FIGS. 16A-B) which receives signaling from callee telephone 162 and sends utterances to a second caller 163. Callee makes Multi-Channel Quiet Call input selections that are signaled to Multi-Channel Quiet Call server 160 for transmitting the appropriate audible utterance to the second caller 163. The in-band signaling may itself be audible to initiating caller 161 (e.g., as in a continuous three-way call connection shown in FIG. 16A) or may be screened from initiating caller 161 (e.g., as in a relay connection or shown in FIG. 16B). Additionally, the conversation between the first caller 161 and the receiving callee will not be audible to second caller 163. The Multi-Channel Quiet Call server 160 also allows the callee to change conversations between caller 161 and caller 163.

b. Out-of-Band Selection for Adding Voice Audio

Figure 17:
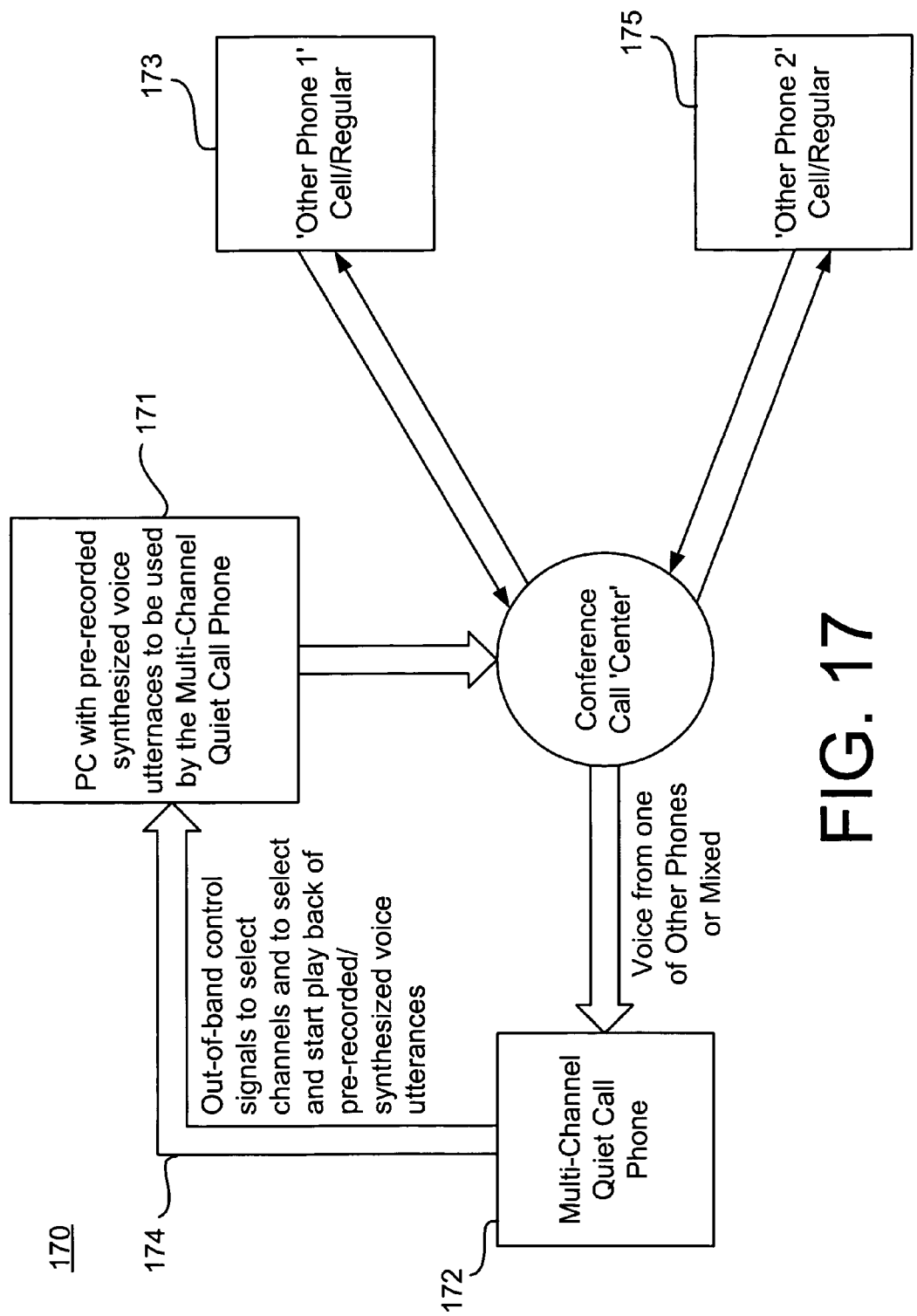
FIG. 17 illustrates a Multi-Channel Quiet Call out-of-band telecommunication infrastructure, according to an embodiment of the present invention.

A selected channel and phrase element may be communicated to a Multi-Channel Quiet Call server through some means other than a voice channel of the telephone call. FIG. 17 illustrates an out-of-band telecommunication infrastructure embodiment 170. As with in-band signaling, each call may be placed through a service number (proxy answer approach described above) or directly to the receiving caller's telephone. A Multi-Channel Quiet Call server is connected to the voice calls through a relay configuration.

The following describes out-of-band control embodiments.

First, a related voice and data connections embodiment may be used. Telecommunication systems (such as Integrated Services Digital Network, ("ISDN") carry voice and data on separate channels. For example, instead of the telecommunication provider sending a ring voltage signal to ring a bell in your telephone (in-band signal), the provider sends a digital packet on a separate channel (out-of-band signal). A call is processed by a telecommunications service provider by establishing a voice channel and a related control data stream. Control information is sent to a Multi-Channel Quiet Call server independently from a voice communication using the alternate data channel. A Multi-Channel Quiet Call server, being in connection with each channel, introduces the appropriate utterances to the appropriate channels as described above.

Second, a digital communication, such as Code Division Multiple Access ("CDMA") and VoIP, encode voice and data as bits and allow for simultaneous communication by interleaving the packets on digital channels.

Third, a separate data connection embodiment may be used. In an embodiment, a handset is set up with a separate data connection or a second device (e.g., wirelessly connected PDA) to communicate control information between a receiving caller and Multi-Channel Quiet Call server.

Fourth, an additional telephone connection embodiment maybe used. A handset is set up with a multiple channel capability or several telephones could be used. One call would communicate control information between a receiving caller's Multi-Channel Quiet Call Phone 172 and Multi-Channel Quiet Call server 171. The other telephone One 173 and other telephone Two 175 would each have a connection between all parties (initiating callers, receiving caller, and server application). However, the conference call center would control, based on channel selections from Multi-Channel Quiet Call Phone 172, which channels receive which communications.

Fifth, when using a channel supporting simultaneous mixed digital voice and data (e.g., VoIP combined with an IP-enabled phone acting as the Multi-Channel Quiet Call Phone), synthetic or pre-recorded conversation elements and channel selections may be stored as simple data packets on a telephone handset.

Out-of-band signaling has the advantage that the control signals do not have to be hidden, disguised (e.g., as rhythmic patterns), or endured (e.g., touch tones). The disadvantage is that several communication channels require management, except in the case of intermixed voice and data packet communication (e.g., VoIP).

ii. VoIP Telecommunication Infrastructure

VoIP is the ability to make telephone calls and send faxes over IP-based data networks with a suitable quality of service (QoS) and superior cost/benefit. See http://www.protocols.com/papers/voip.htm and http://www.techquide.com. Voice, channel, and other data is encoded into data packets and sent using Internet Protocol.

Net2phone's (http://www.net2phone.com) Parity software (http://www.paritysw.com/products/spt_ip.htm) "PC with Voice Software" provides a VoIP telephony development Application Program Interface ("API") according to an embodiment of the invention.

In a VoIP embodiment, information is transferred by way of the Internet, telephone switches and/or local networks. FIGS. 18A-18H illustrate various telecommunication infrastructure embodiments using VoIP functionality. The infrastructure embodiments differ in where the Multi-Channel Quiet Call voice utterances are stored/generated and in whether the phones used in Multi-Channel Quiet Calls dialogue are IP-enabled. Table A shows seven different configurations related to various infrastructure embodiments illustrated in FIGS. 18A-18H.

TABLE A

Figure 18A:
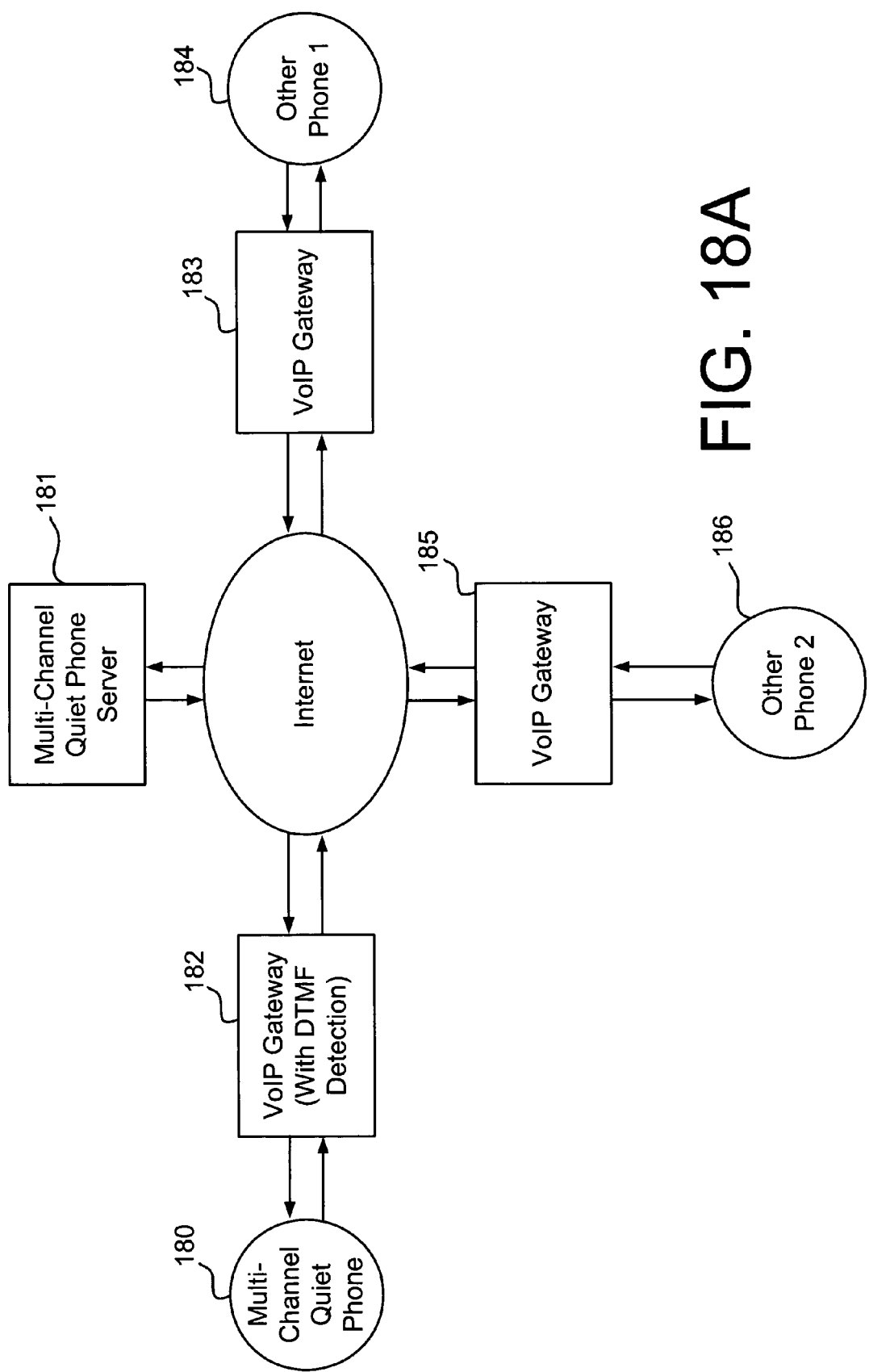
FIGS. 18A-18H illustrate a VoIP telecommunication infrastructure, according to an embodiment of the present invention.
Figure 18B:
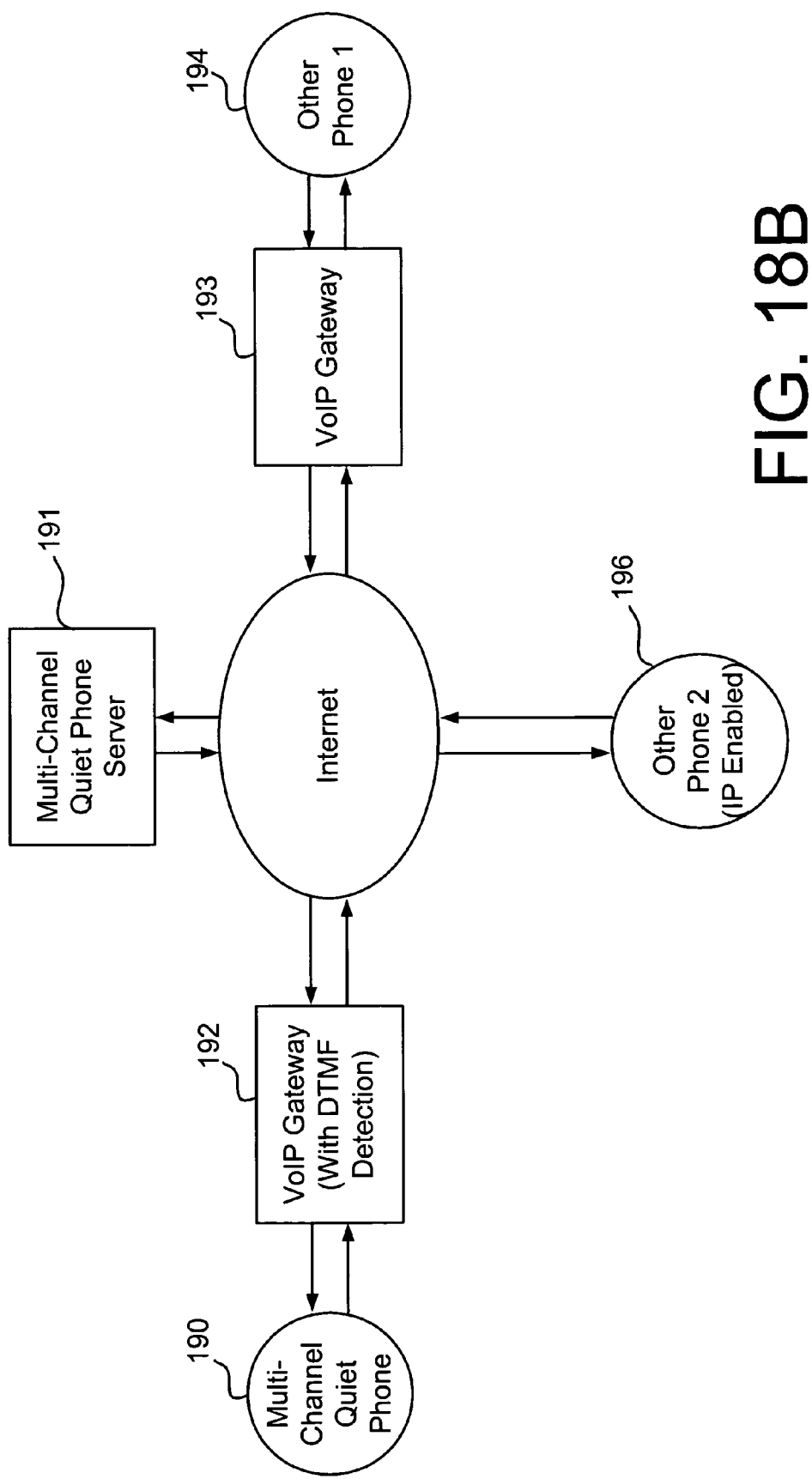
Figure 18C:
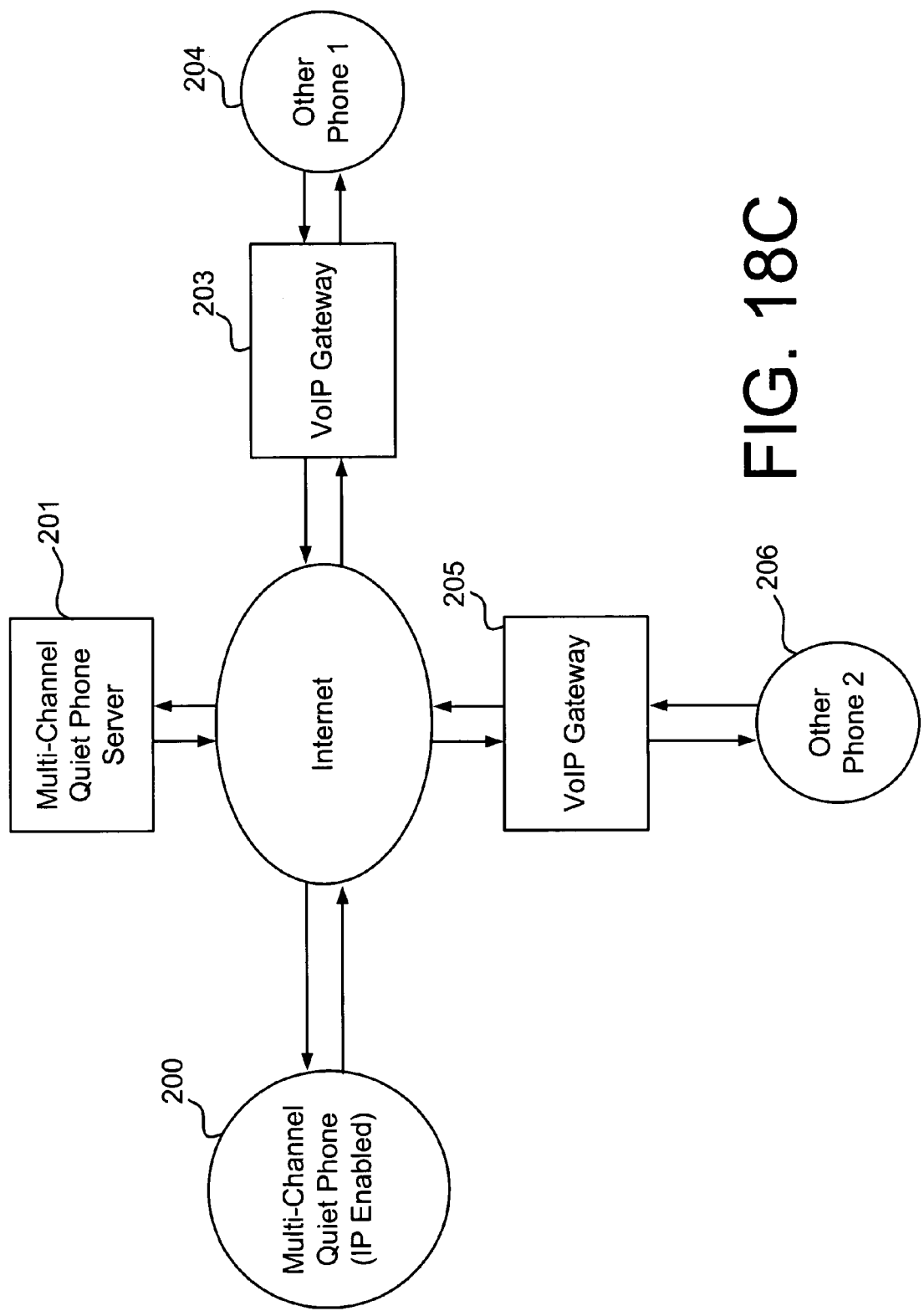
Figure 18D:
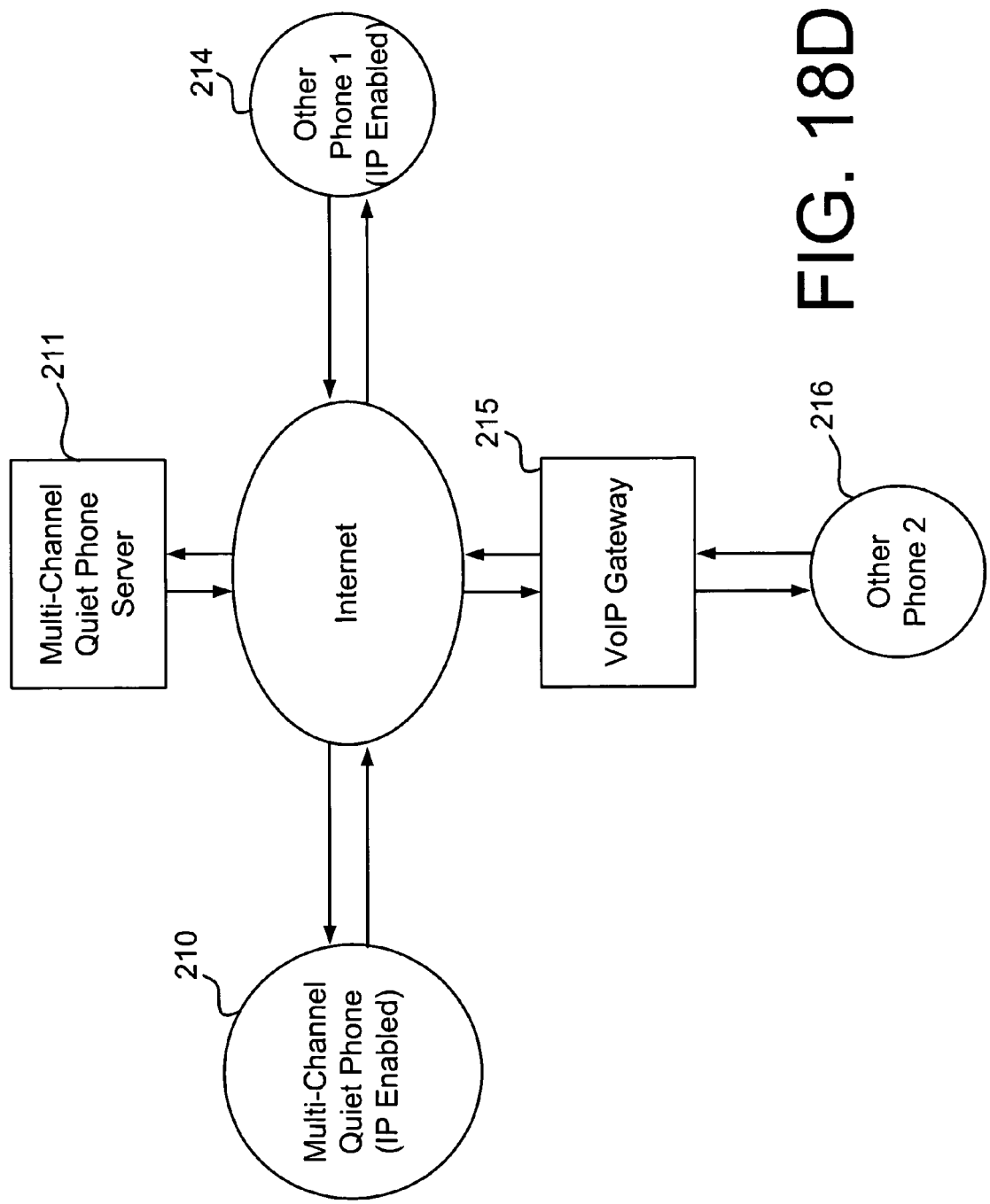
Figure 18E:
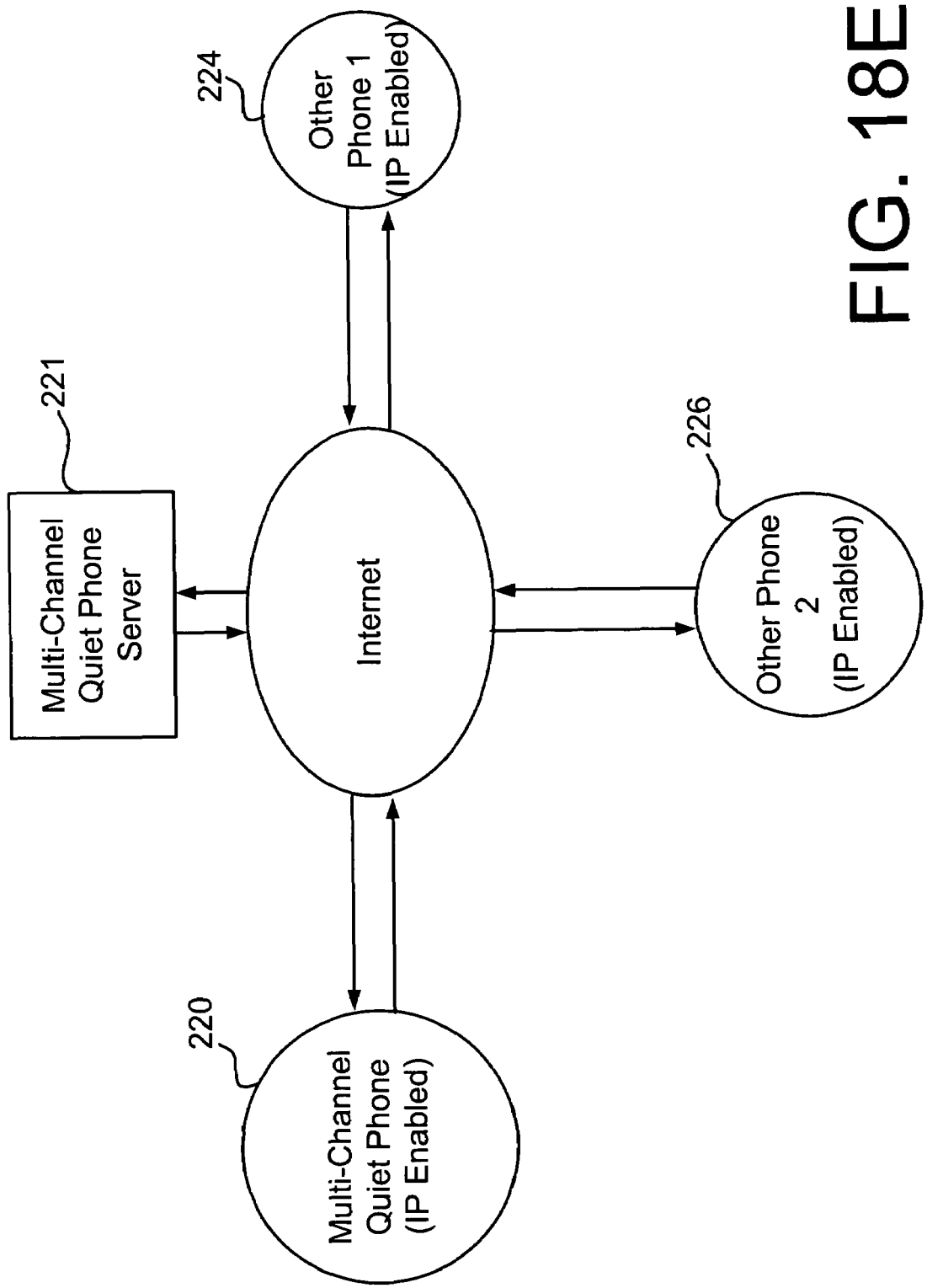
Figure 18F:
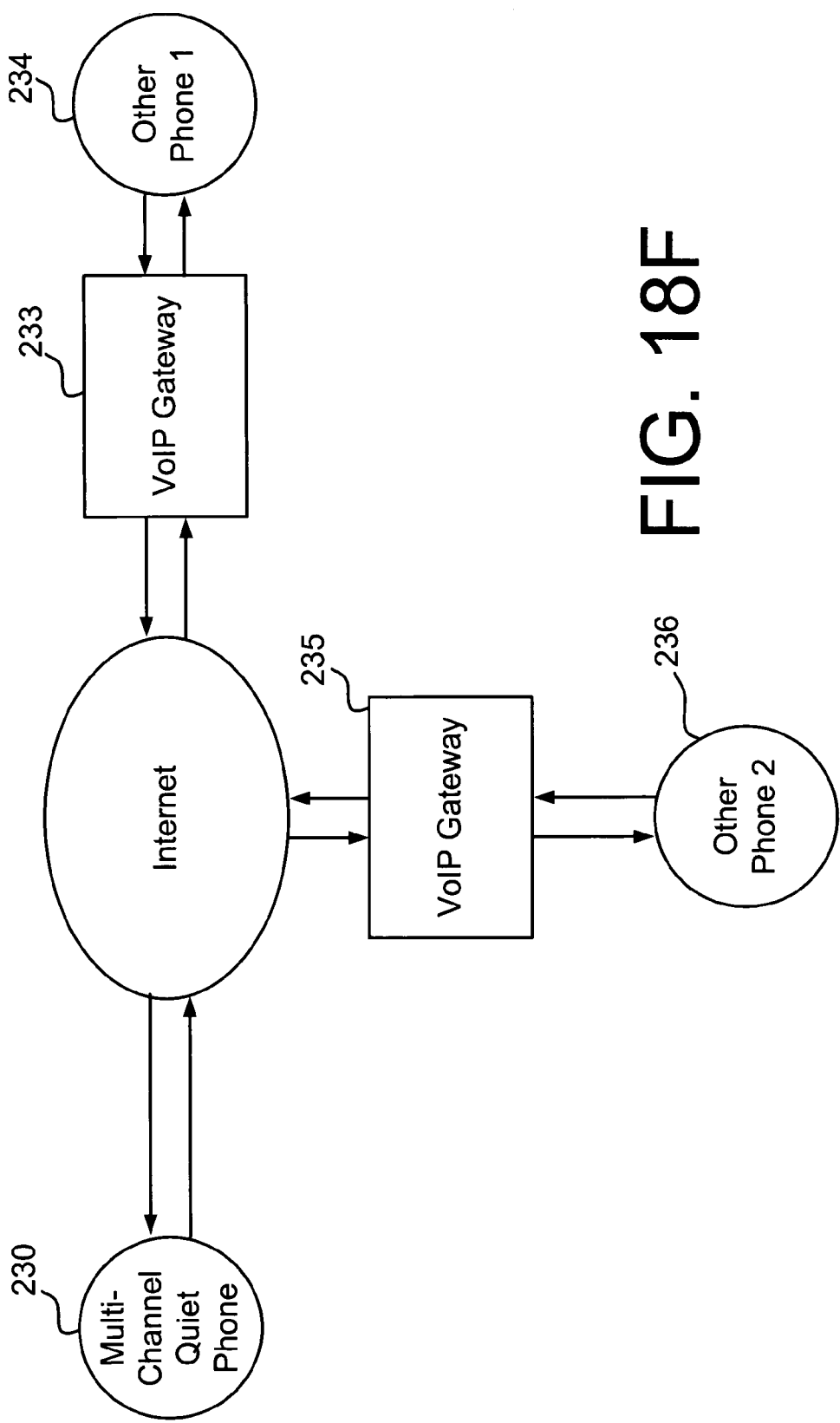
Figure 18G:
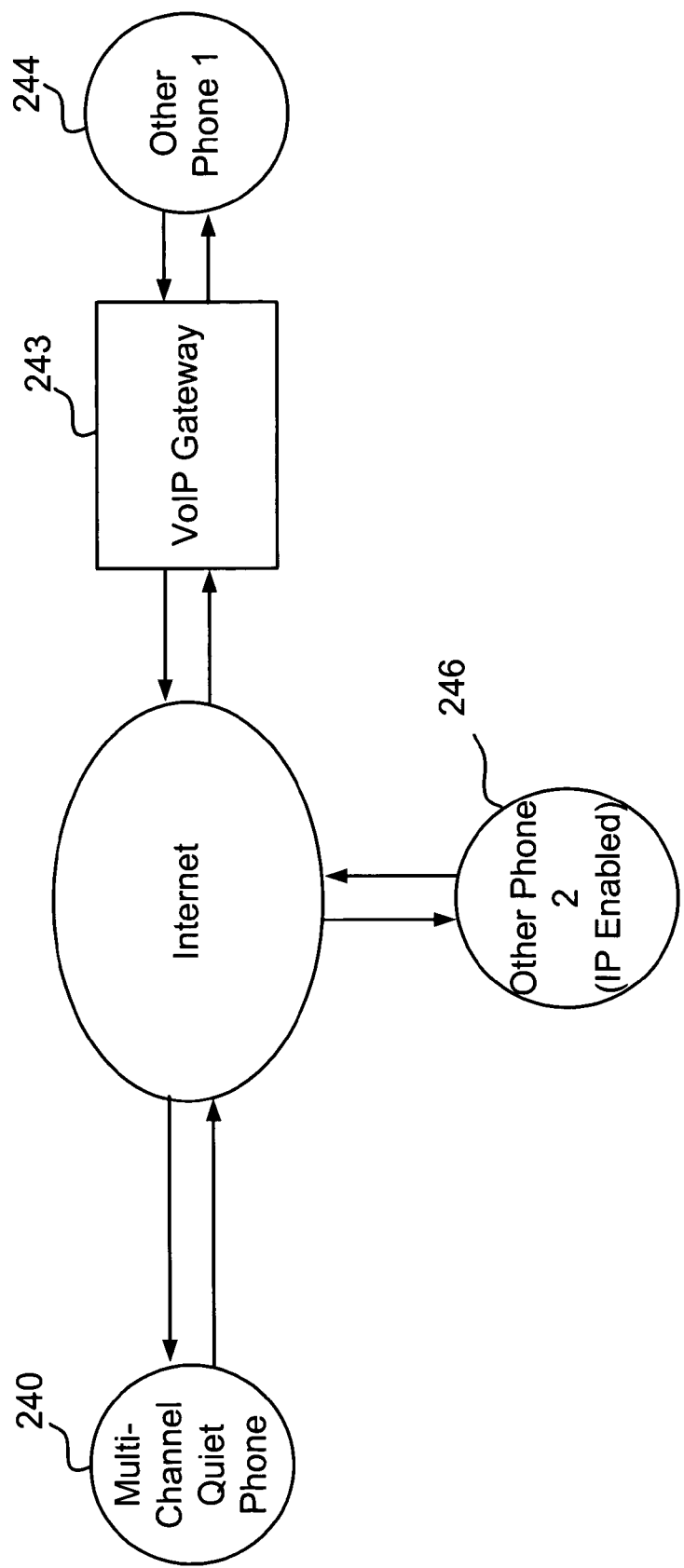
Figure 18H:
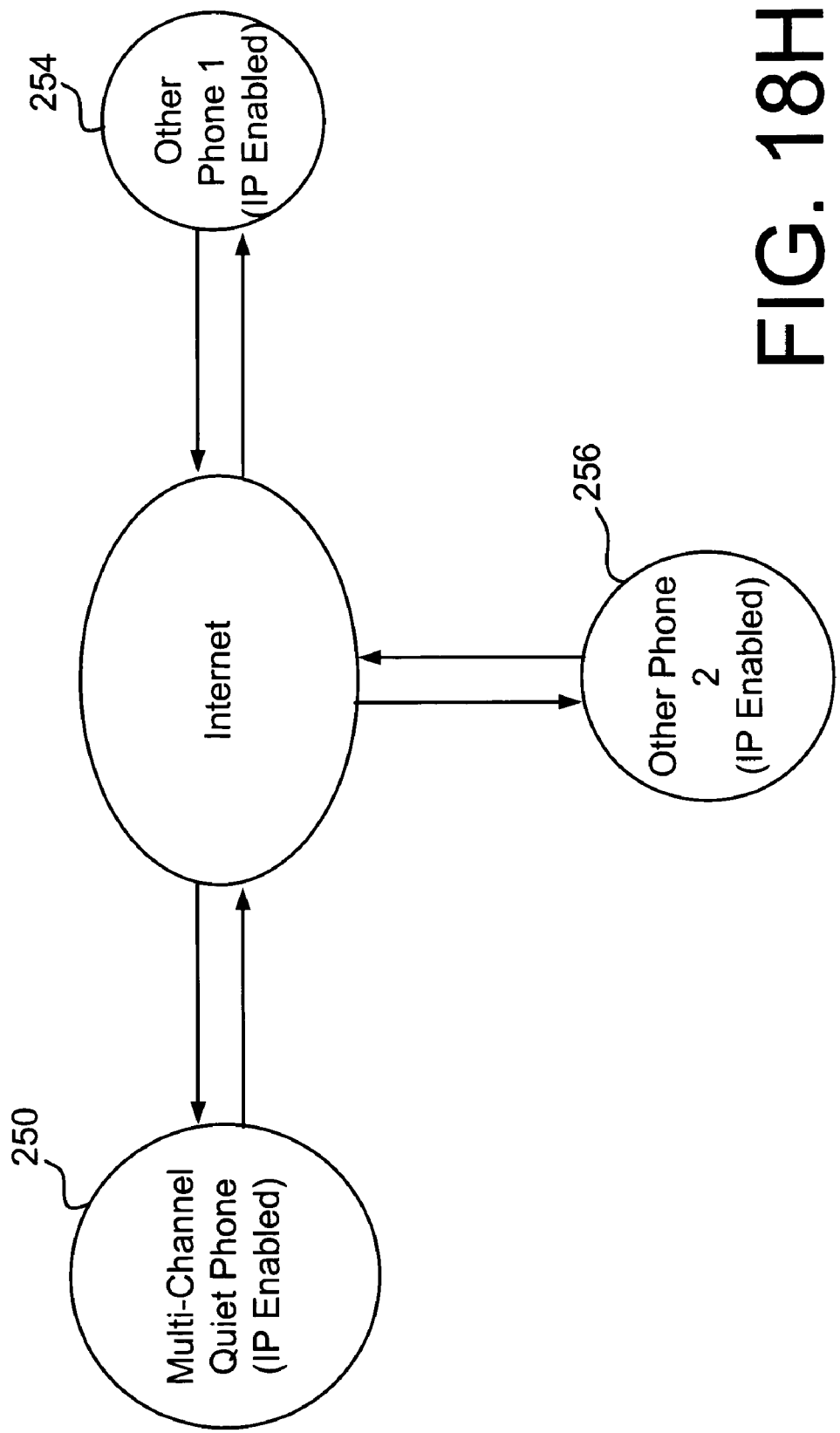

| Multi-Channel Quiet Phone IP-enabled (yes/no) | Other Phone One IP-enabled (yes/no) | Other Phone Two IP-enabled (yes/no) | Voice Utterances Stored/Generated on the Multi-Channel Quite Phone (yes/no) | Figure Illustrating the Telecommunication Infrastructure |
|---|---|---|---|---|
| No | No | No | No | FIG. 18a |
| No | Yes | No | No | FIG. 18b |
| Yes | No | No | No | FIG. 18c |
| Yes | Yes | No | No | FIG. 18d |
| Yes | Yes | Yes | No | FIG. 18e |
| Yes | No | No | Yes | FIG. 18f |
| Yes | No | Yes | Yes | FIG. 18g |
| Yes | Yes | Yes | Yes | FIG. 18h |

In FIG. 18A, a non-IP-enabled telephone 180 capable of issuing DTMF signals acts as a Multi-Channel Quiet Phone and controls channel selection and the playback/generation of voice utterances from a Multi-Channel Quiet Phone server 181 via a VoIP gateway 182. The DTMF control signals are detected by VoIP gateway 182 and routed to the Multi-Channel Quiet phone server 181 as IP data packets with the appropriate Multi-Channel Quiet Call control codes (including channel selections and audio selections). The Multi-Channel Quiet Phone server 181 receives the IP data packets with the Multi-Channel Quiet Call control codes and responds by sending the stored/generated Multi-Channel Quiet Call voice utterances as IP data packets to either VoIP gateway 183 communicating with the Other Phone One 184 or the VoIP gateway 185 communicating with the Other Phone Two 186 based on channel selection contained in the data packets received from Multi-Channel Quiet Phone 180.

Simultaneously, a user of Multi-Channel Quiet Phone 180 can converse with one of the parties. Voice from Multi-Channel Quiet Phone 180 goes through VoIP gateway 182 and is routed to Multi-Channel Quiet Phone server 181 as IP data packets including channel information. Multi-Channel Quiet Phone server 181 sends the data packets to the corresponding VoIP Gateway for which verbal conversation is selected.

Voice from Other Phone One 184 goes to VoIP gateway 183 and voice from Other Phone Two 186 goes through VoIP gateway 185 and are routed to the Multi-Channel Quiet phone server 181 as IP data packets. The Multi-Channel Quiet phone server 181 either sends one set of data packets to VoIP gateway 182 or all data packets depending on a user's selection.

In FIG. 18A, any telephone capable of generating DTMF signals can be turned into a Multi-Channel Quiet Phone by simply subscribing to the Multi-Channel Quiet Phone service residing on Multi-Channel Quiet Phone server 181. Additionally, Multi-Channel Quiet Phone 180 may communicate with any number of other phones using Multi-Channel Quiet Phone server 181.

In FIG. 18B, a non-IP-enabled telephone 190 capable of issuing DTMF signals acts as a Multi-Channel Quiet Phone and controls channel selection and the playback/generation of voice utterances from a Multi-Channel Quiet Phone server 191 via a VoIP gateway 192. The DTMF control signals are detected by VoIP gateway 192 and routed to the Multi-Channel Quiet phone server 191 as IP data packets with the appropriate Multi-Channel Quiet Call control codes (including channel and audio selections). The Multi-Channel Quiet Phone server 191 receives the IP data packets with the Multi-Channel Quiet Call control codes and responds by sending the stored/generated Multi-Channel Quiet Call voice utterances as IP data packets to either VoIP gateway 193 communicating with the Other Phone One 194 or directly to IP-enabled Other Phone Two 196 based on channel selection contained in the data packets received from the Multi-Channel Quiet Phone 190.

Simultaneously, a user of Multi-Channel Quiet Phone 190 can converse with one of the parties. Voice from Multi-Channel Quiet Phone 190 goes through VoIP gateway 192 and is routed to Multi-Channel Quiet Phone server 191 as IP data packets including channel information. Multi-Channel Quiet Phone server 191 sends the data packets to either VoIP Gateway 193 for Other Phone One 194 or directed to Other Phone Two 196, depending upon which Other Phone One or Two the user has selected to verbally converse with. Voice from Other Phone One 194 goes to VoIP gateway 193 which transmits data packets to Multi-Channel Quiet phone server 191 and voice from Other Phone Two 196 is directly routed to the Multi-Channel Quiet phone server 191 as IP data packets. The Multi-Channel Quiet phone server 191 either sends one set of data packets to VoIP gateway 192 or sends all data packets depending on a user's selection.

In FIG. 18B, any telephone capable of generating DTMF signals can be turned into a Multi-Channel Quiet Phone by simply subscribing to the Multi-Channel Quiet Phone service residing on Multi-Channel Quiet Phone server 191. Additionally, Multi-Channel Quiet Phone 190 may communicate with any number of other phones of any type, using Multi-Channel Quiet Phone server 191.

In FIG. 18C, an IP-enabled telephone 200 acts as the Multi-Channel Quiet Phone and controls channel selection and the playback/generation of voice utterances from the Multi-Channel Quiet Phone server 201 by sending Multi-Channel Quiet Call control codes as IP data packets to the Multi-Channel Quiet Phone server 201. The Multi-Channel Quiet Phone server 201 receives the IP data packets with the Multi-Channel Quiet Call control codes and responds by sending stored/generated Multi-Channel Quiet Call voice utterances as IP data packets to either VoIP gateway 203 communicating with the Other Phone One 204 or VoIP gateway 205 communicating with Other Phone Two 206 depending on the channel selected by a user of Multi-Channel Quiet phone 200.

Voice from the Other Phone One 204 goes to the VoIP gateway 203 and voice from Other Phone Two goes through VoIP gateway 203, each of which are routed to the Multi-Channel Quiet Phone server 201. Multi-Channel Quiet Phone server 201 either sends one set of data packets to Multi-Channel Quiet Phone 200 or all data packets, depending on user selection.

Any IP-enabled phone can be used as a Multi-Channel Quiet Phone by subscribing to the Multi-Channel Quiet Phone service residing on Multi-Channel Quiet Phone server 201. Additionally, Multi-Channel Quiet Phone 200 may communicate with any number of other phones of any type, using Multi-Channel Quiet Phone server 201.

In FIG. 18D, an IP-enabled telephone acts as a Multi-Channel Quiet Phone 210 and controls channel selection and the playback/generation of voice utterances from a Multi-Channel Quiet Phone server 211 by sending Multi-Channel Quiet Call control codes as IP data packets to the Multi-Channel Quiet Phone server 211. The Multi-Channel Quiet Phone server 211 receives the IP data packets with the Multi-Channel Quiet Call control codes and responds by sending stored/generated Multi-Channel Quiet Call voice utterances as IP data packets to either IP-enabled Other Phone One 214 or the VoIP gateway 215 communicating with the Other Phone Two 216 based on the channel selected by the user of Multi-Channel Quiet Phone 211.

Voice from the Other Phone One 214 is routed to Multi-Channel Quiet Phone server 211 as IP data packets, and voice from the Other Phone Two 216 goes through VoIP gateway 215 and is routed to the Multi-Channel Quiet Phone server 211 as IP data packets. Multi-Channel Quiet Phone server 211 either sends one set of data packets and Multi-Channel Quiet Phone 210 or all data packets, depending upon user selection.

Any IP-enabled phone can be used as a Multi-Channel Quiet Phone by subscribing to Multi-Channel Quiet Phone service residing on Multi-Channel Quiet Phone server 211. Additionally, Multi-Channel Quiet Phone 210 may communicate with any number of other phones of any type, using Multi-Channel Quiet Phone server 211.

In FIG. 18E, an IP-enabled telephone 220 acts as the Multi-Channel Quiet Phone and controls channel selection and the playback/generation of voice utterances from the Multi-Channel Quiet Phone server 221 by sending Multi-Channel Quiet Call control codes as IP data packets to the Multi-Channel Quiet Phone server 221. The Multi-Channel Quiet Phone server 221 receives the IP data packets with the Multi-Channel Quiet Call control codes and responds by sending the stored/generated Multi-Channel Quiet Call voice utterances as IP data packets directly to either IP-enabled Other Phone One 224 or to IP-enabled Other Phone Two 226 depending upon channel selection information received from Multi-Channel Quiet Call Phone 220.

Voice from the Other Phone One 224 and Other Phone Two 226 are routed directly to the Multi-Channel Quiet Phone 220 as IP data packets. Multi-Channel Quiet Phone Server 221 either sends one set of data packets to Multi-Channel Quiet Phone 220 or all data packets, depending upon user selection.

Any IP-enabled phone can be used as a Multi-Channel Quiet Phone 220 by subscribing to Multi-Channel Quiet Phone service residing on Multi-Channel Quiet Phone server 221. Additionally, Multi-Channel Quiet Phone 220 may communicate with any number of other phones of any type, using Multi-Channel Quiet Phone server 221.

In FIG. 18F, an IP-enabled telephone acts as Multi-Channel Quiet Phone 230 and controls channel selection and sends stored/generated Multi-Channel Quiet Call voice utterances as IP data packets to either VoIP gateway 233 communicating with the Other Phone One 234 or VoIP gateway 235 communicating with the other Phone Two 236 based on channel selection. Voice from the Other Phone One 234 goes to the VoIP gateway 234 and is routed to the Multi-Channel Quiet Phone 230 as IP data packets. Voice from the Other Phone Two 236 goes to the VoIP gateway 235 and is routed to Multi-Channel Quiet Phone phone 230 as IP data packets. Multi-Channel Quiet Phone 230 receives the sets of packets and either provides audio from one channel to a user for listening, or mixes audio by combining the data packet sets, which allows a user to listen to multiple channels simultaneously.

In FIG. 18G, an IP-enabled telephone acts as Multi-Channel Quiet Phone 240 and controls channel selection and sends stored/generated Multi-Channel Quiet Call voice utterances as IP data packets to either VoIP gateway 243 communicating with the Other Phone One 244 or directly to other IP-enabled Phone Two 246 based on channel selection.

Voice from the Other Phone One 244 goes to the VoIP gateway 243 and is routed to the Multi-Channel Quiet Phone 240 as IP data packets, and voice from Other Phone Two 246 is routed directly to Multi-Channel Quiet Phone 240 as IP data packets. Multi-Channel Quiet Phone 240 receives the sets of packets and either provides audio from one channel to a user for listening, or mixes audio by combining the data packet sets, which allows a user to listen to multiple channels simultaneously.

In FIG. 18H, an IP-enabled telephone acts as the Multi-Channel Quiet Phone 250 and controls channel selection and sends stored/generated Multi-Channel Quiet Call voice utterances as IP data packets to either the IP-enabled Other Phone One 254 or the IP-enabled Other Phone Two 256 based on channel selection.

Voice from Other Phone One 254 and Other Phone Two 256 are routed to the Multi-Channel Quiet Phone 250 as IP data packets. Multi-Channel Quiet Phone 250 receives the sets of packets and either provides audio from one channel to a user for listening, or mixes audio by combining the data packet sets which allows a user to listen to multiple channels simultaneously.

iii. Wireless Telephony Applications and Interfaces

In an embodiment, Wireless Telephony Applications Framework ("WTA") within a Wireless Application Protocol ("WAP") is used for a Multi-Channel Quiet Call embodiment. For example, Multi-Channel Quiet Call software is stored on a WTA server accessed from a microbrowser stored on a mobile telephone.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system, comprising:
   (a) a multi-channel mobile telephone, wherein the multi-channel mobile telephone supports a plurality of channels;
   (b) a processing device for storing an internal representation of a phrase element which can be predefined, recorded as needed, or synthetically generated on demand; and, (c) a scanning device for reading a first code associated with the phrase element and for reading a second code associated with a first channel of the plurality of channels;

wherein the processing device transforms a user's silent input selection of the first code associated with the phrase element into an audible output utterance only over the first channel associated with said second code while enabling the user to verbally communicate a second audible output utterance over a second channel of the plurality of channels with no audible feedback into the first channel;

wherein audible input from the first channel is mixed with audible input from the second channel, or a graphic representation of audio input on the first channel is visually displayed to the user while audio input on the second channel is communicated audibly to the user.

2. The system of claim 1, wherein the processing device includes:

a channel selection device, for selecting at least one of the plurality of channels responsive to said second code.

3. The system of claim 1, wherein the scanning device is a barcode scanner.

4. The system of claim 1, wherein the scanning device is a laser scanner.

5. The system of claim 1, further comprising a multi-channel quiet call server.

6. The system of claim 1, wherein the multi-channel mobile telephone supports IP and/or dual tone multiple frequency.

7. The system of claim 1, wherein after scanning in the first code associated with the phrase element, a phrase is synthetically generated on demand into an audible output utterance over the first channel associated with said second code.

8. The system of claim 1, wherein text to speech conversion is used to synthetically generate on demand an audible output utterance over the first channel associated with said second code.

9. The system of claim 1, further comprising a graphic user interface.

10. The system of claim 1, wherein the user can initiate one or more conversations on one or more channels of the plurality of channels.

11. The system of claim 1, wherein the user can maintain one audible conversation, and a plurality of silent conversations.

\* \* \* \* \*